(12) United States Patent
Katsuyama et al.

(10) Patent No.: US 11,067,792 B2
(45) Date of Patent: Jul. 20, 2021

(54) TWO-DIMENSIONAL OPTICAL SCANNING MIRROR DEVICE, MANUFACTURING METHOD FOR SAME, TWO-DIMENSIONAL OPTICAL SCANNER AND IMAGE PROJECTOR

(71) Applicant: National University Corporation University of Fukui, Fukui (JP)

(72) Inventors: Toshio Katsuyama, Fukui (JP); Ryoya Ishigami, Tsuruga (JP)

(73) Assignee: NATIONAL UNIVERSITY CORPORATION UNIVERSITY OF FUKUI, Fukui (JP)

( * ) Notice: Subject to any disclaimer, the term of this patent is extended or adjusted under 35 U.S.C. 154(b) by 0 days.

(21) Appl. No.: 16/193,084

(22) Filed: Nov. 16, 2018

(65) Prior Publication Data
US 2019/0101746 A1    Apr. 4, 2019

Related U.S. Application Data

(63) Continuation of application No. PCT/JP2017/038740, filed on Oct. 26, 2017.

(30) Foreign Application Priority Data

Oct. 31, 2016    (JP) .............................. JP2016-212976

(51) Int. Cl.
*G02B 26/10*    (2006.01)
*G02B 26/08*    (2006.01)
(Continued)

(52) U.S. Cl.
CPC ......... *G02B 26/101* (2013.01); *G02B 26/085* (2013.01); *G03B 21/2066* (2013.01);
(Continued)

(58) Field of Classification Search
CPC ................ G02B 26/085; G02B 26/101; G03B 21/2066; G03B 21/2013; G03B 21/2033; H01F 10/08; H01F 41/32; H04N 9/3129
(Continued)

(56) References Cited

U.S. PATENT DOCUMENTS

2004/0135644 A1    7/2004    Mizoguchi et al.
2006/0119925 A1    6/2006    Orcutt
(Continued)

FOREIGN PATENT DOCUMENTS

CN    103309033 A    9/2013
CN    106062900 A    10/2016
(Continued)

OTHER PUBLICATIONS

Machine Translation of JP2005181576A (Year: 2019).*
(Continued)

*Primary Examiner* — Jerry L Brooks
(74) *Attorney, Agent, or Firm* — Westerman, Hattori, Daniels & Adrian, LLP

(57) ABSTRACT

A two-dimensional optical scanning mirror device, a manufacturing method for the same, a two-dimensional optical scanning device and an image projector. A two-dimensional optical scanning mirror device includes a substrate, a movable mirror portion supported on the substrate in such a manner that two-dimension optical scanning is possible, a hard magnetic thin film provided in the movable mirror portion and a magnetic field generator that includes at least an alternating magnetic field generator for driving the movable mirror portion, where the hard magnetic thin film has a magnetization direction in a direction of a film plane, and the ratio of the magnetic field generated by the magnetic field generator relative to the coercive force of the hard magnetic thin film is 0.2 or lower.

9 Claims, 26 Drawing Sheets

(51) Int. Cl.
  *H04N 9/31* (2006.01)
  *H01F 10/08* (2006.01)
  *G03B 21/20* (2006.01)
  *H01F 41/32* (2006.01)
  *G02B 27/01* (2006.01)

(52) U.S. Cl.
  CPC ............ *H01F 10/08* (2013.01); *H01F 41/32* (2013.01); *H04N 9/3129* (2013.01); *G02B 27/0172* (2013.01); *G03B 21/2013* (2013.01); *G03B 21/2033* (2013.01)

(58) Field of Classification Search
  USPC .......................................................... 353/98
  See application file for complete search history.

(56) References Cited

U.S. PATENT DOCUMENTS

| | | | |
|---|---|---|---|
| 2009/0043211 A1* | 2/2009 | Ting | G02B 27/0006 600/478 |
| 2009/0134319 A1 | 5/2009 | Sprague et al. | |
| 2010/0046054 A1 | 2/2010 | Jeong et al. | |
| 2010/0073262 A1 | 3/2010 | Matsumoto | |
| 2013/0242265 A1* | 9/2013 | Kato | H04N 9/3144 353/31 |
| 2016/0372657 A1* | 12/2016 | Nakata | G11B 5/653 |

FOREIGN PATENT DOCUMENTS

| | | | | |
|---|---|---|---|---|
| EP | 3054676 A1 | | 8/2016 | |
| EP | 3163352 A1 | | 5/2017 | |
| JP | 6-82711 A | | 3/1994 | |
| JP | 2004-102267 A | | 4/2004 | |
| JP | 2004-297923 A | | 10/2004 | |
| JP | 2004297923 A | * | 10/2004 | ............ G02B 26/10 |
| JP | 2005-84571 A | | 3/2005 | |
| JP | 2005-169553 A | | 6/2005 | |
| JP | 2005-181576 A | | 7/2005 | |
| JP | 2005181576 A | * | 7/2005 | ............ B81B 3/00 |
| JP | 2008-242207 A | | 10/2008 | |
| JP | 2010-49259 A | | 3/2010 | |
| JP | 2013-045990 A | | 3/2013 | |
| JP | 2013-195603 A | | 9/2013 | |
| JP | 2014-016387 A | | 1/2014 | |
| JP | 2014-130287 A | | 7/2014 | |
| JP | 2016-12042 A | | 1/2016 | |
| WO | 2008/013368 A1 | | 1/2008 | |
| WO | 2015/198523 A1 | | 12/2015 | |

OTHER PUBLICATIONS

Machine Translation of JP2004297923A (Year: 2019).*
Yalcinkaya et al., "NiFe Plated Biaxial MEMS Scanner for 2-D Imaging", IEEE Photonics Technology Letters, Mar. 2007, vol. 19, No. 5, pp. 330-332, cited in Specification (3 pages).
International Search Report dated Jan. 16, 2018, issued in counterpart application No. PCT/JP2017/038740, w/ English translation (4 pages).
Written Opinion dated Jan. 16, 2018, issued in counterpart application No. PCT/JP2017/038740, w/English translation (9 pages).
Office Action dated Jun. 23, 2020, issued in counterpart JP Application No. 2016-212976, with English translation (7 pages).
Wang, James et al., "A Review of Preparation, Properties and Applications of Rare Earth Magnetic Thin Films", Nova Science Publishers, Inc., Oct. 18, 2011, XP055660244, pp. 1-70; Cited in Extended European Search Report dated Feb. 10, 2020. (70 pages).
Extended (Supplementary) European Search Report dated Feb. 10, 2020, issued in counterpart EP Application No. 17864993.5. (12 pages).
Office Action dated Nov. 10, 2020, issued in counterpart JP Application No. 2016-212976, with English Translation. (5 pages).
Office Action dated Jan. 21, 2021, issued in counterpart CN Application No. 201780035679X, with English . Translation. (21 pages).
Office Action dated Jan. 20, 2021, issued in counterpart TW Application No. 106137293, with English Translation. (16 pages).
Non-Final Office Action dated Mar. 3, 2021, issued in U.S. Appl. No. 16/858,890 (25 pages).
Extended European Search Report dated Apr. 20, 2021, issued in EU application No. 20215978.6 (12 pages).

* cited by examiner

ALTERNATING CURRENT

MAGNETIZATION DIRECTION

MAGNETIZATION DIRECTION

TWO-DIMENSIONAL OPTICAL SCANNING MIRROR DEVICE, MANUFACTURING METHOD FOR SAME, TWO-DIMENSIONAL OPTICAL SCANNER AND IMAGE PROJECTOR

TECHNICAL FIELD

The present invention relates to a two-dimensional optical scanning mirror device, a manufacturing method for the same, a two-dimensional optical scanner and an image projector, and in particular, to the structure of a reflecting mirror device for scanning a light beam, and a manufacturing method for the same as well as a two-dimensional optical scanner and an image projector using the same.

BACKGROUND ART

Various optical scanning mirror devices are known as conventional devices for scanning a light beam such as a laser beam in two directions that are orthogonal to each other. From among these, MEMS (Micro Electro Mechanical Systems) mirror devices are widely used because the devices can be miniaturized.

MEMS mirror devices are known to include the electrostatic drive type, the piezo drive type and the electromagnetic drive type in accordance with the drive system. From among these, electromagnetic drive type MEMS optical scanning mirror devices use the force in a magnetic field.

A "movable coil system" where a coil is formed in a movable portion for scanning light so that a mirror can be rotated within a specified angle range using Lorentz force in a static magnetic field applied from the outside has been proposed for the electromagnetic drive type MEMS optical scanning mirror device. (See Patent Literature 1 or Patent Literature 2.) In addition, a "movable magnet system" where a magnetic body is formed in a movable portion for scanning light so that a mirror can be rotated within a specified angle range using repulsion and attraction in a modulated magnetic field applied from the outside has been proposed (see Patent Literature 3 or Non-Patent Literature 1).

CITATION LIST

Patent Literature

Patent Literature 1: Japanese Laid-open Patent Publication No. 2008-242207
Patent Literature 2: Japanese Laid-open Patent Publication No. 2016-012042
Patent Literature 3: Japanese Laid-open Patent Publication No. 2010-049259
Patent Literature 4: Japanese Laid-open Patent Publication No. 2013-195603
Patent Literature 5: U.S. Laid-open Patent Publication No. 2010/0073262

Non-Patent Literature

Non-Patent Literature 1: IEEE Photonics Technology Letters, Vol. 19, No. 5, pp. 330-332, Mar. 1, 2007

SUMMARY OF INVENTION

Problems to be Solved by the Invention

From among the above-described electromagnetic drive type MEMS mirror devices, in the latter movable magnet system, it is necessary to form a magnetic body in a movable portion for scanning light, and thus, such a problem arises that it is difficult to miniaturize the movable portion for scanning light due to the formation of a magnetic body in addition to a mirror because magnetic bodies usually are of a large volume. Another problem arises where the structure of the movable portion is complex as compared to movable portions consisting of only a mirror. These problems are fatal for the formation of MEMS mirror devices, particularly compact ones.

An object of the present invention is to simplify and miniaturize the structure of the movable mirror portion.

Means for Solving the Problems

According to one aspect, a two-dimensional optical scanning mirror device has a substrate, a movable mirror portion that has an optical scanning rotation axis and is supported on the substrate in such a manner that two-dimensional optical scanning is possible, a hard magnetic thin film provided in the movable mirror portion, and a magnetic field generator that includes at least an alternating magnetic field generator for driving the movable mirror portion are provided on the substrate, where the magnetization direction of the hard magnetic thin film is in the direction of the film plane, and the ratio of the magnetic field generated by the magnetic field generator to the coercive force of the hard magnetic thin film is 0.2 or less.

According to another aspect, a manufacturing method for a two-dimensional optical scanning mirror device includes the step of forming a hard magnetic thin film on a substrate, the step of magnetizing the hard magnetic thin film, and the step of forming a movable mirror portion by processing the magnetized hard magnetic thin film.

According to still another aspect, a two-dimensional optical scanner includes a two-dimensional optical scanning mirror device as described above and a light source formed on the substrate.

According to yet another aspect, an image projector includes a two-dimensional optical scanner as described above, a two-dimensional optical scanning controller for two-dimensionally scanning light that is emitted from a light source as described above by applying a two-dimensional optical scanning signal to the alternating magnetic field generator, and an image formation unit for projecting the emission light that has been scanned onto a projection plane.

Advantageous Effects of the Invention

As one advantageous effect, it becomes possible to simplify and miniaturize the structure of a movable mirror portion.

DESCRIPTION OF EMBODIMENTS

In reference to FIGS. 1 through 7, an example of the two-dimensional optical scanning mirror device according to an embodiment of the present invention is described as follows. The present invention can be provided since the present inventor has reached the conclusion as a result of diligent research that it is possible to simplify and miniaturize the structure of a movable mirror portion by using a magnetic thin film for the magnetic body instead of a conventional bulk magnetic body. The use of a magnetic thin film makes it possible to provide a lighter movable mirror portion so that the magnetic field for driving the system can be made smaller. In addition, the above-described problems are solved by using a hard magnetic thin film of which the coercive force is a predetermined value or higher, particularly a hard magnetic thin film of which the coercive force is such that the ratio of the magnetic field generated by the magnetic field generator 30 that at least includes an alternating magnetic field generator to the coercive force is 0.2 or less, that is to say, the magnitude of the coercive force is 5 (=1/0.2) times greater or more of the magnetic field generated by the magnetic field generator 30 in order to compensate the decrease in the coercive force in the case where the magnetic thin film is used.

Figure 1:
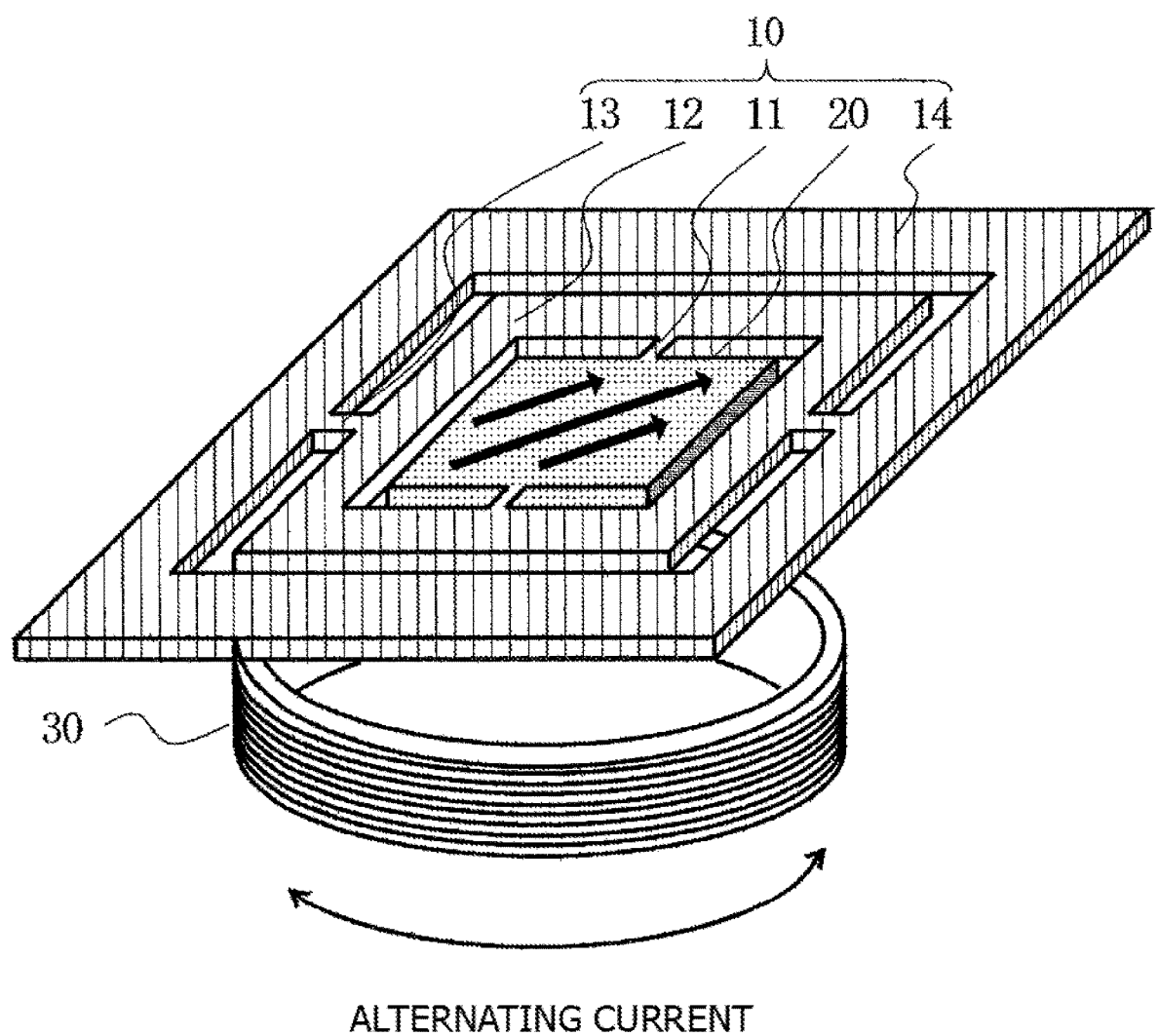
FIG. 1 is a schematic perspective diagram illustrating an example of the two-dimensional optical scanning mirror device according to an embodiment of the present invention.

FIG. 1 is a schematic perspective diagram illustrating the two-dimensional optical scanning mirror device according to an embodiment of the present invention, which is provided with a movable mirror portion 10 and a magnetic field generator 30 that includes at least an alternating magnetic field generator for driving the movable mirror portion 10. The movable mirror portion 10 has a reflection portion 20, a rotational outer frame 12 for supporting the reflection portion 20 with a pair of first hinges 11 that provide a first optical scanning rotation axis, and a non-rotational outer frame 14 for supporting the rotational outer frame 12 with a pair of second hinges 13 that provides a second optical scanning rotation axis in the direction that is orthogonal to the first hinges 11. It is necessary to determine the high-speed rotation of the first hinges 11 and the second hinges 13 to be the rotational frequency that is inherent to the reflection portion 20. This inherent rotational frequency is determined by the form and mass of the reflection portion 20, the spring constant of the rotational portion and the like. The thickness of the first hinges 11 and the second hinges 13 is approximately 2 µm to 50 µm, and typically the thickness is 10 µm.

Figure 2A:
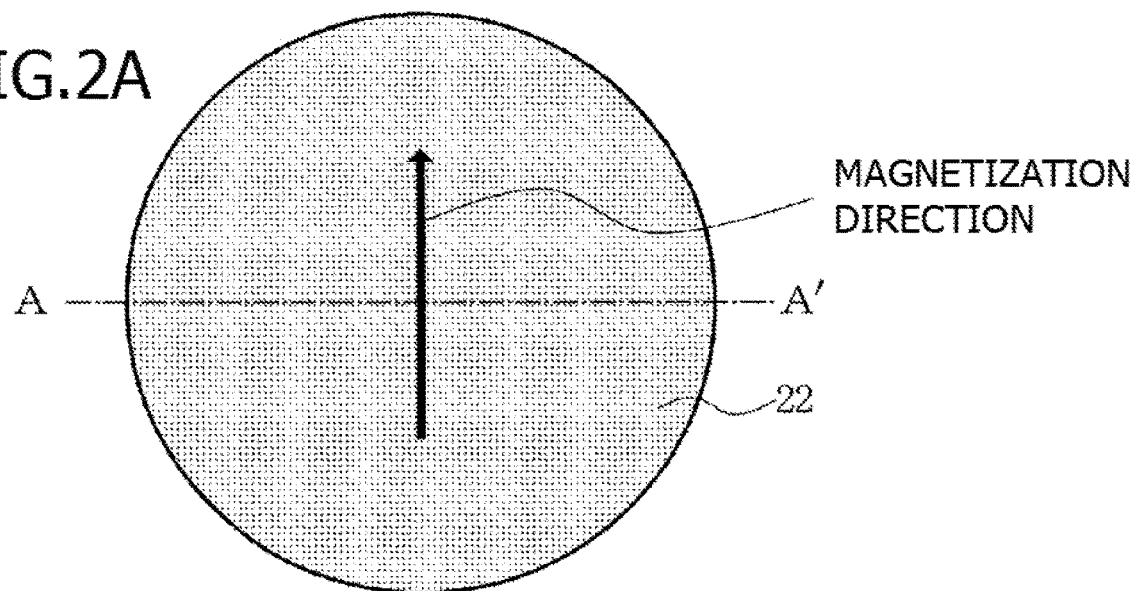
FIGS. 2A and 2B are diagrams illustrating an example of the structure of the reflection portion.
Figure 2B:
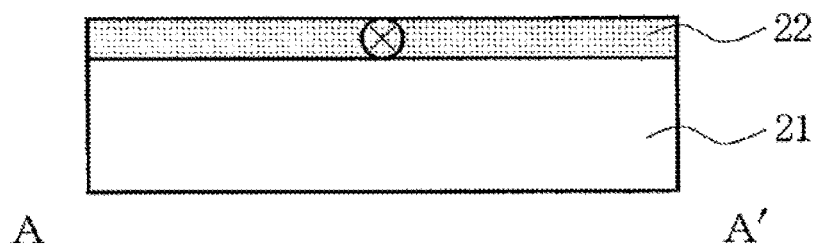

FIGS. 2A and 2B are diagrams illustrating an example of the structure of the reflection portion. FIG. 2A is an upper diagram, and FIG. 2B is a cross-sectional diagram along the single-dotted chain line connecting A and A' in FIG. 2A. The reflection portion 20 has a substrate 21 and a hard magnetic thin film 22 provided on the substrate 21. The hard magnetic thin film 22 has a large coercive force of which the demagnetization curve protrudes greatly, and thus can be a permanent magnet. Here, the hard magnetic thin film 22 is defined so as to have a coercive force of 10 kA/m or greater. According to the present invention, however, the hard magnetic thin film 22 may have a coercive force that is five times greater or more than that of the magnetic field generated by the magnetic field generator 30, and a hard magnetic thin film having a coercive force of 100 kA/m or greater is preferable. Hereinafter, a preferable example of the present invention is described using a hard magnetic thin film that has a coercive force of 100 kA/m or greater.

When the movable mirror portion 10 is operated repeatedly, the magnetic field force working in the direction of the high-speed rotation frequently interrupts the external magnetic field for driving the system, and therefore diminishes gradually. Meanwhile, the magnetic field force that is applied in the direction of the low speed rotation does not diminish much. Therefore, the direction of the magnetic field gradually becomes smaller than 45° relative to the direction of the high-speed rotation, and thus, the characteristics of the mirror deteriorate. In the case where the coercive force is 100 kA/m or greater, however, the deterioration of the mirror characteristics can be suppressed under a conventional state of use. Accordingly, the coercive force of 100 kA/m or greater is preferable in the case of a two-dimensional operation. Here, the difference between the coercive force that is required for two-dimensional scanning and the alternating magnetic field is sufficiently great, and thus, the mirror characteristics barely deteriorate even when the movable mirror portion 10 is operated repeatedly in the case where the ratio of the magnetic field generated by the magnetic field generator 30 that includes at least an alternating magnetic field generator to the coercive force is 0.2 or less. In the experiments, only an alternating magnetic field generator was used as the magnetic field generator 30, and the magnetic field generated by a solenoid coil, which was used as the alternating magnetic field generator, was 2 kA/m to 20 kA/m (which corresponds to 25 gauss to 250 gauss), and thus, the ratio of the magnetic field generated by the alternating magnetic field generator to the coercive force required for two-dimensional scanning was 0.2 or less in the case where only an alternating current for driving the mirror was made to flow.

The closer to 1 the squareness ratio is, the better the characteristics as a permanent magnet are. As described below, according to the data measured in the experiments, the squareness ratio(=residual magnetic flux density Br/maximum magnetic flux density Bm)≈0.82, and therefore, it is desirable for the squareness ratio to be 0.7 or greater when estimated from thus-calculated value.

Hard magnetic thin films such as the hard magnetic thin film 22 generally have a high light reflectance, and therefore, the hard magnetic thin film 22 can be used as a reflecting mirror, which makes it unnecessary to install an extra structure other than the hard magnetic thin film 22 in the movable mirror portion 10. Thus, the structure of the movable portion in the movable mirror portion 10 is simplified, which makes miniaturization possible. In addition, it is not necessary for the hard magnetic thin film 22 to be provided only on the reflection portion 20 in FIG. 1, but the hard magnetic thin film 22 may be additionally formed on the rotational outer frame 12 and the non-rotational outer frame 14. When the hard magnetic thin film 22 is formed on the rotational outer frame 12, the rotation around the low speed scanning axis becomes easier because the total force in the magnetic field becomes greater.

It is necessary for the hard magnetic thin film 22 to be magnetized in the direction of the film plane, and in particular, it is desirable for the direction of the magnetization of the hard magnetic thin film to be at an angle within a range of 45°+/−30° relative to the first hinges 11 that provide the first optical scanning rotation axis of the movable mirror portion 10. When the direction is within this angle range, two axial rotation scanning becomes possible. Here, the shape of the reflection portion 20 is circular; however, it may be elliptical, square, rectangular or other polygonal shapes.

Figure 3A:
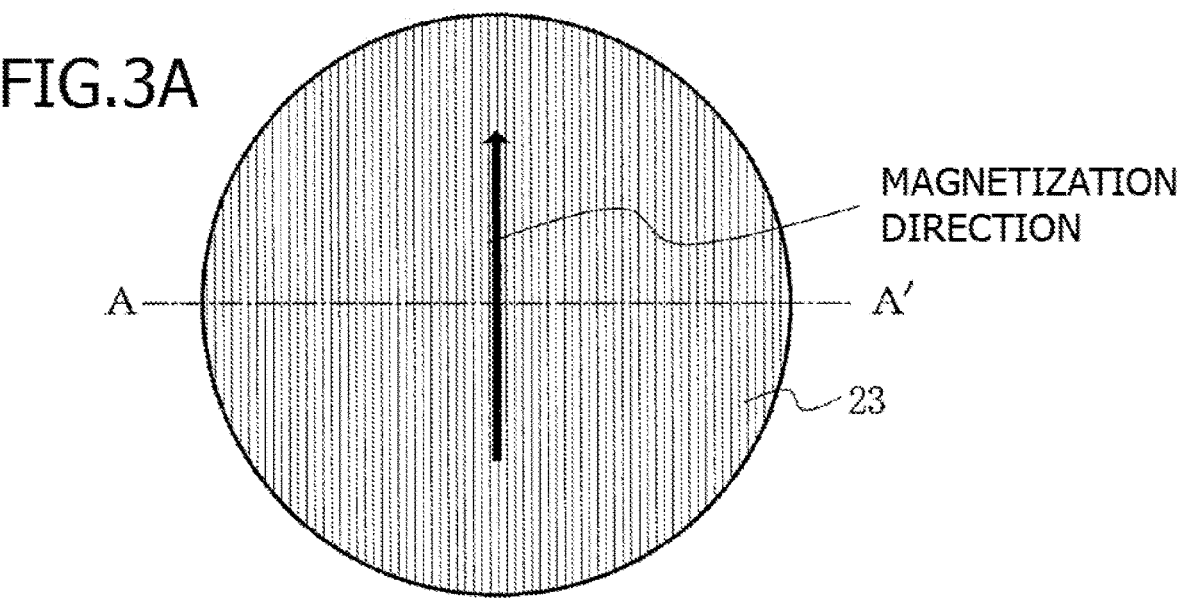
FIGS. 3A and 3B are diagrams illustrating another example of the structure of the reflection portion.
Figure 3B:
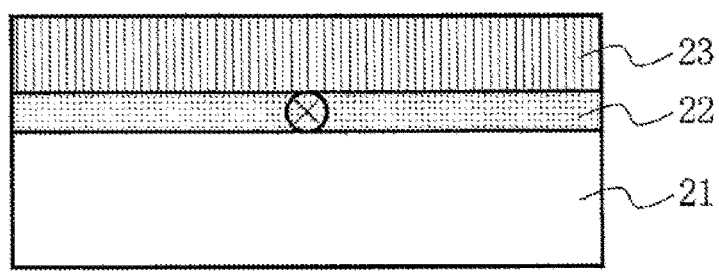

FIGS. 3A and 3B are diagrams illustrating another example of the structure of the reflection portion. FIG. 3A is an upper diagram, and FIG. 3B is a cross-sectional diagram along the single-dotted chain line connecting A and A' in FIG. 3A. The reflection portion 20 has a substrate 21, a hard magnetic thin film 22 provided on the substrate 21, and a reflective film 23 that becomes a reflecting mirror provided on the hard magnetic thin film 22, and is useful in the case where a higher light reflectance is required. In this case as well, the structure of the movable mirror portion 10 is not complex only by being additionally provided with a reflective film 23, and thus, miniaturization is possible.

Figure 4A:
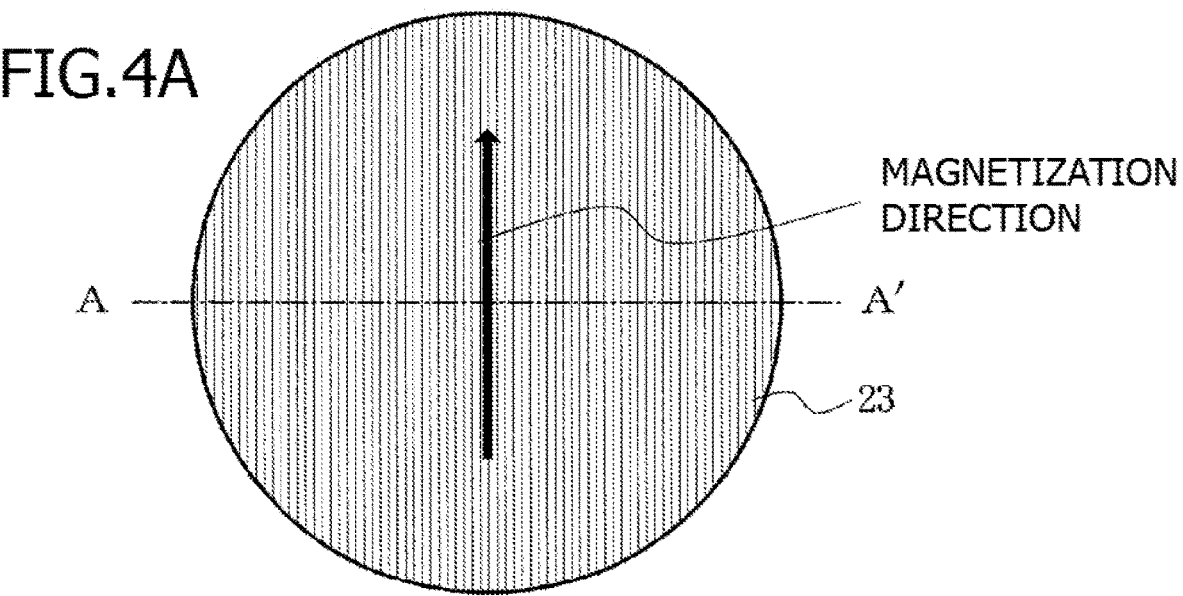
FIGS. 4A and 4B are diagrams illustrating still another example of the structure of the reflection portion.
Figure 4B:
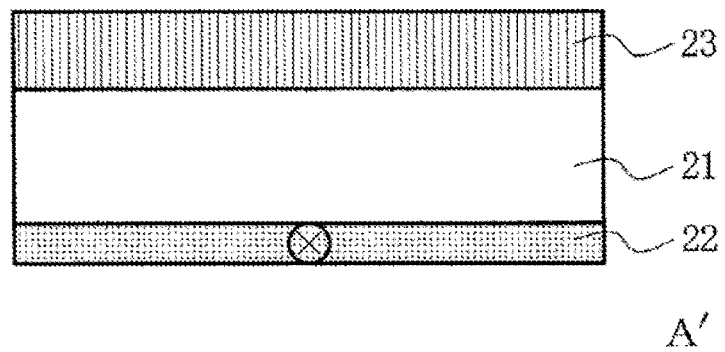

FIGS. 4A and 4B are diagrams illustrating still another example of the structure of the reflection portion. FIG. 4A is an upper diagram, and FIG. 4B is a cross-sectional diagram along the single-dotted chain line connecting A and A' in FIG. 4A. The reflection portion 20 has a substrate 21, a hard magnetic thin film 22 provided on one surface of the substrate 21, and a reflective film 23 provided on the other surface of the substrate 21. In this case as well, the reflection portion 20 is useful in the case where a higher light reflectance is required, and the structure of the movable mirror portion 10 is not complex only by being provided with a reflective film 23, and thus, miniaturization is possible.

Though solenoid coils are typical examples of alternating magnetic field generators, an iron core made of soft iron with a coil being wound may be used. Though it is desirable for the solenoid coils to be compact and able to generate a high magnetic field, the size thereof does not have any limitations. When the present embodiment was implemented, for example, a solenoid coil having an outer diameter of 5 mm and a height of 3 mm, where the number of turns of the wire was 800, and a solenoid coil having an outer diameter of 2.46 mm, an inner diameter of 1.21 mm and a height of 1.99 mm, where the number of turns of the wire was 600, were fabricated. Here, the alternating magnetic field generator is not limited to solenoid coils, and any device that can generate a magnetic field that is sufficient for rotating the movable mirror portion 10 may be used, and as an example, plane spiral coils formed in a spiral on a plane may be used.

As for the entire configuration of the movable mirror portion 10, the rotational outer frame 12 and the non-rotational outer frame 14 may be formed of metal glass so that they can also function as a reflecting mirror or may be formed of a non-magnetic dielectric film such as a $SiO_2$ film. In this case, the substrate 21 runs at least beneath the non-rotational outer frame 14. Though a single crystal silicon substrate is a typical example of the substrate 21, a glass substrate or a crystal substrate may be used.

It is desirable for the hard magnetic thin film 22 to be a precious metal based magnetic film, particularly one made of any of a magnetic material having main components of Fe and Pt, a magnetic material having main components of Co and Pt, or a magnetic material having main components of Fe and Pd. Though the thickness of the hard magnetic thin film 22 does not have any limitations, the thicker ones can make the total amount of the generated magnetic flux greater, and thus can make the current flowing through the alternating magnetic field generator smaller. The thickness of the hard magnetic thin film 22 is in a range from 10 nm to the thickness that is approximately the same as that of the substrate 21. In this case, the hard magnetic thin film 22 may have a two-layer structure with a non-magnetic insulating film such as a $SiO_2$ film in between or may have a multiple-layer structure such as a three layer structure, where the film thickness of each layer may be the same or different and the composition of each layer may be the same or different. The method for forming the film is not particularly limited as long as a target film can be gained, and a vapor deposition method, a sputtering method, a plating method and an application method can be cited as examples.

The reflective film 23 may be made of any kind of material that reflects light, and metal glass such as ZrCuAlNi, Fe-based metal glass, an Al film, an Au film or a dielectric multilayer film may be used. In addition, a protective film such as a $SiO_2$ film may be formed on the upper surface of the reflective film 23, between the reflective film 23 and the hard magnetic thin film 22, between the hard magnetic thin film 22 and the substrate 21, or on the bottom surface of the substrate 21.

In the case where the movable mirror portion 10 is integrated on the same substrate as the light source for generating a light beam that is incident into the reflecting mirror, it is desirable for the reflective surface of the movable mirror portion 10 to be inclined relative to the main surface of the substrate 21, that is to say, relative to the incident light beam, at an angle within a range of 45°+/−30°. The method for inclining the movable mirror portion 10 in this manner includes a method for inclining the reflection portion 20 and the rotational outer frame 12 relative to the light beam by a predetermined angle, for example, 45°, with a mechanical external force and irradiating the second hinges 13 with a focused laser beam so as to locally heat the second hinges 13 in order to hold the state of the reflection portion 20 and the rotational outer frame 12 inclined by 45°.

Figure 5A:
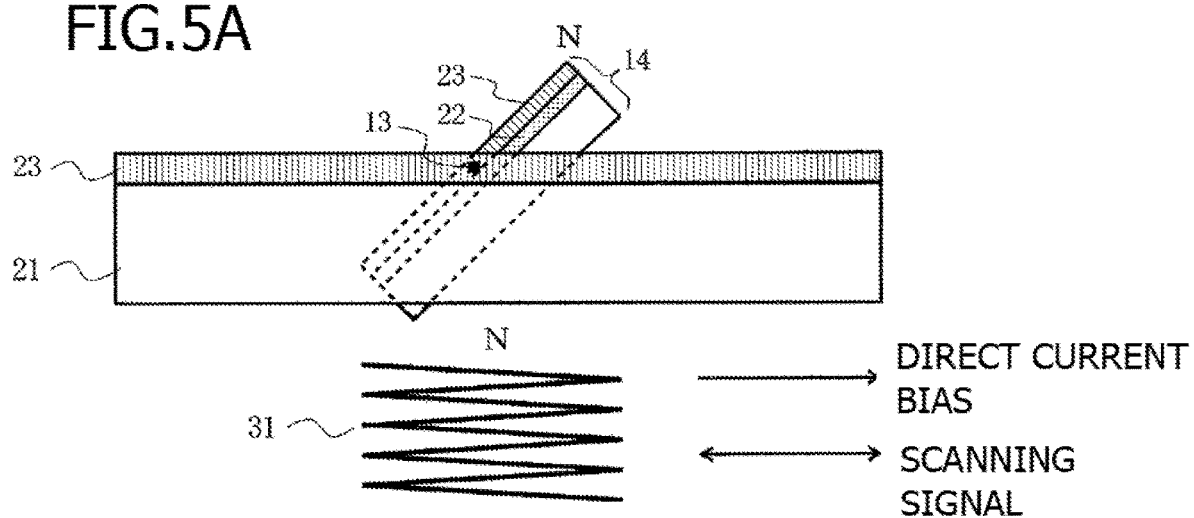
FIGS. 5A and 5B are diagrams illustrating a method for magnetically inclining the movable mirror portion.
Figure 5B:
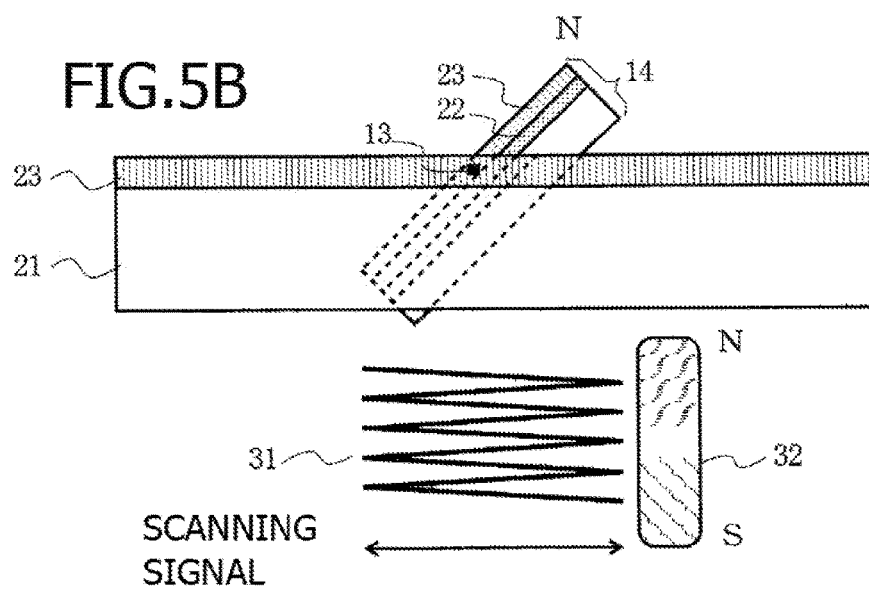

Another method may be to magnetically incline the movable mirror portion 10. FIGS. 5A and 5B are diagrams illustrating a method for magnetically inclining the movable mirror portion 10. FIG. 5A is a diagram illustrating a case where the movable mirror portion is inclined through a direct current bias. When a direct bias current is made to flow constantly through the alternating magnetic field generator 31, the movable mirror portion can be inclined by 45° relative to the light beam through the interaction between the N pole of the magnetized reflection portion 20 and the N pole of the alternating magnetic field generator 31 that is generated by the direct bias current. As a result, an alternating current signal can be made to flow in addition to this direct current so that the reflection portion 20 can be rotated with the position where the reflection portion 20 is inclined by 45° at the center. In this case, the coercive force of the hard magnetic thin film 22 is set to be five times greater or more of the magnetic field that results from the synthesis of the magnetic field generated by the direct bias current and the magnetic field generated by the alternating current.

FIG. 5B is a diagram illustrating a case where the movable mirror portion is inclined by using a permanent magnet. The movable mirror portion 10 can be inclined by arranging a permanent magnet 32 beneath the movable mirror portion 10. In this case, the coercive force of the hard magnetic thin film 22 is set to be five times greater or more of the magnetic field that has been synthesized from the magnetic field generated by the permanent magnet 32 and the magnetic field generated by the alternating magnetic field generator 31. Here, it is also possible to reflect the light beam toward the plate side of the substrate 21 by inclining the movable mirror portion by 45° in the opposite direction by adopting the same structure of the movable mirror portion as illustrated in FIGS. 4A and 4B, which can also be applied to the case in FIG. 5A. In this case, the hard magnetic thin film 22 is also used as the reflective film, and the reflective film 23 made of a metal glass film or the like may be used as a member for forming the hinges.

In addition, the center axis of the alternating magnetic field generator 31 can be shifted from the center portion of the reflection portion 20 by a predetermined distance d along the direction of the optical axis of the light beam in order to make it possible to lower the intensity of the direct current by 50% as compared to the case where the center axis of the alternating magnetic field generator 31 and the center portion of the reflection portion 20 match. For example, it is possible to lower the intensity of the direct current by 50% by shifting the center axis of the alternating magnetic field generator 31 and the center portion of the reflection portion 20 by d=1 mm as compared to the case where the two match.

In order to fabricate a two-dimensional optical scanning mirror device as described above, a hard magnetic thin film 22 may be formed on a substrate 21, and after that, the hard magnetic thin film 22 may be magnetized in a magnetic field, and the magnetized hard magnetic thin film 22 may be processed to form a movable mirror portion 10. In this case, it is desirable for the hard magnetic thin film 22 to be magnetized after the formation of the movable mirror portion 20 in such a manner that the magnetization is achieved in such a direction at an angle within a range of 45°+/−30° relative to the rotation axis of the optical scanning of the movable mirror portion 20.

Here, the hard magnetic thin film in the same state as being deposited has a small coercive force, and therefore, it is desirable to anneal the hard magnetic thin film before the magnetizing process. The temperature for annealing may be optimized within a range between 200° C. and 1100° C. In addition, it is desirable for the magnetizing process to be carried out before the formation of the mirror structure. The rotational outer frame 12 and the reflection portion 20 are supported only by the second hinges 13 and the first hinges 11 respectively, and therefore, a mechanical stress generated through the application of a large magnetic field that is required for the magnetization would break the mirror structure.

Here, an orientation control film may be provided beneath the hard magnetic thin film as a base layer in order to easily control the direction of the magnetization of the hard magnetic thin film 22. Alternatively, a texturing process for creating trenches or making the surface uneven on the $SiO_2$ film or the like that becomes the base may be carried out instead of providing the orientation control film.

A light source may be provided on the substrate 21 in the above-described two-dimensional optical scanning mirror device in order to form a two-dimensional optical scanner. Alternatively, a two-dimensional optical scanning mirror device as described above may be mounted on a mounting substrate, and at the same time, a light source may be mounted in a location where the two-dimensional optical scanning mirror device is to be irradiated with a laser beam. In this case, it is desirable for the light source to have a red laser, a green laser, a blue laser and an optical multiplexer for multiplexing light outputted from the red laser, the green laser and the blue laser. Alternatively, the light source may additionally have a yellow laser in order to vividly reproduce the color white. Furthermore, an infrared laser may be solely used or may be added to a multicolor visible light laser as described above.

Figure 6:
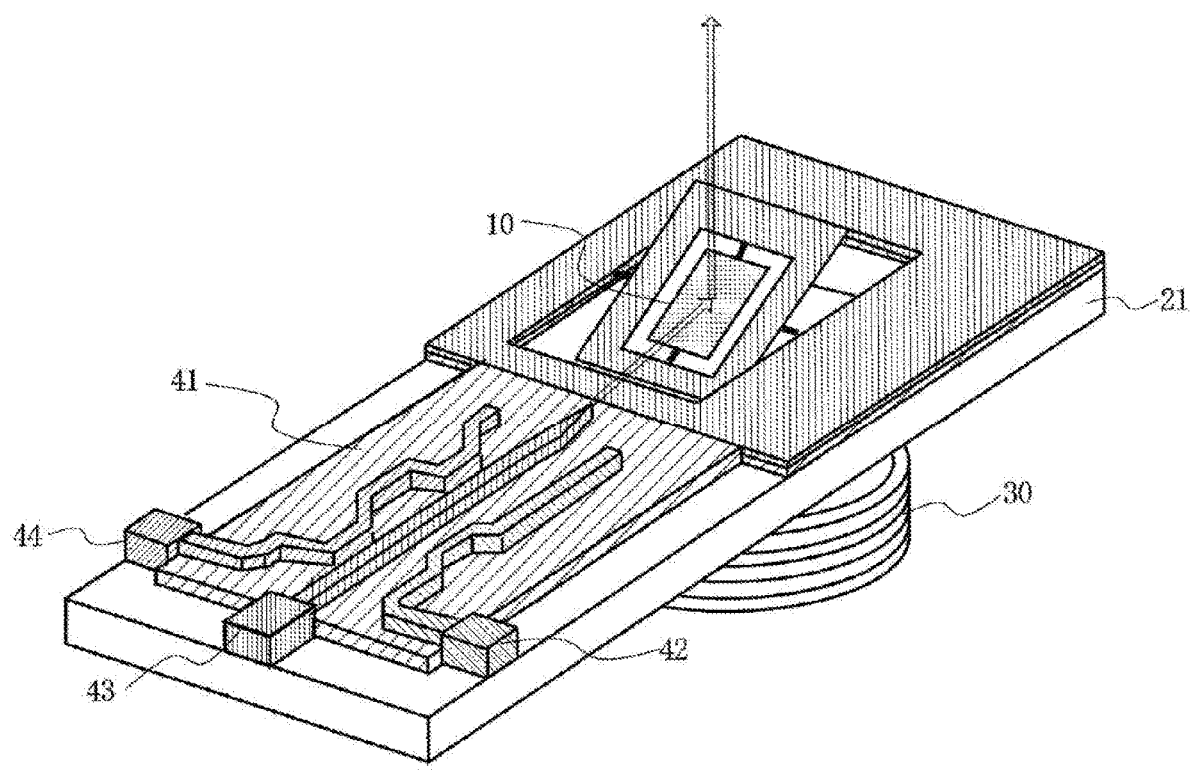
FIG. 6 is a schematic perspective diagram illustrating an example of the two-dimensional optical scanner according to an embodiment of the present invention.

FIG. 6 is a schematic perspective diagram illustrating an example of the two-dimensional optical scanner according to an embodiment of the present invention. An optical multiplexer 41 may be provided on a substrate 21 where a movable mirror portion 10 has been formed, and a red laser 42, a green laser 43 and a blue laser 44 may be coupled to this optical multiplexer 41. Since the movable mirror portion 10 has been miniaturized, the total size after integration can be made smaller in the case where the light source for generating a light beam is integrated. Particularly, in the case of a light source where a light beam is emitted from a semiconductor laser or an optical multiplexer, such a semiconductor laser or optical multiplexer may be formed on a Si substrate or a metal plate substrate, and therefore, the formation of a light source and a two-dimensional optical scanning mirror device on this type of substrate has such an effect that the total size after integration can be made smaller.

In order to form an image projector, a two-dimensional optical scanner as described above, a two-dimensional scanning controller for two-dimensionally scanning light that has been emitted from the light source by applying a two-dimensional optical scanning signal to the magnetic field generator 30 and an image forming portion for projecting the emission light that has been scanned onto a projection surface may be combined. Here, a typical example of the image projector is a spectacle-type retina scanning display (see Patent Literature 4).

Figure 7:
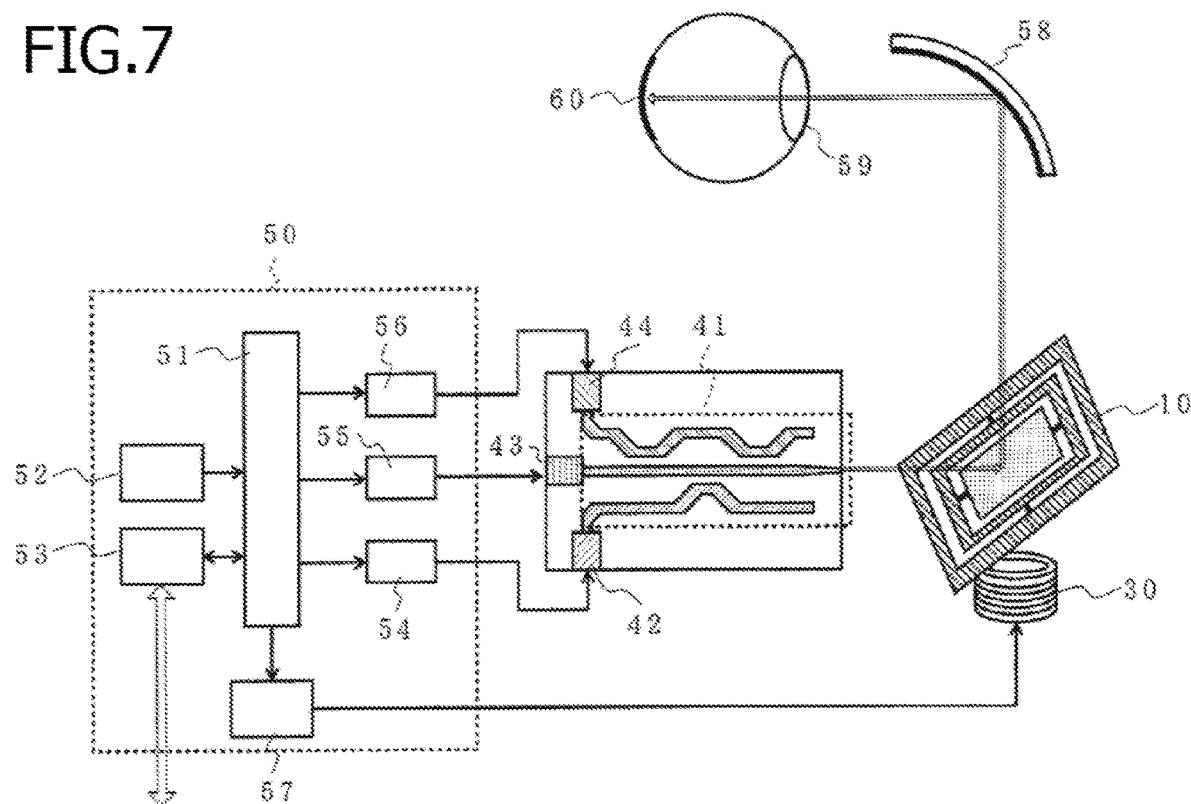
FIG. 7 is a schematic diagram illustrating the configuration of the image projector according to an embodiment of the present invention.

FIG. 7 is a schematic diagram illustrating the configuration of the image projector according to an embodiment of the present invention, where a typical example of the image projector is a spectacle-type retina scanning display (see Patent Literature 4). The image projector according to the embodiment of the present invention is to be worn on the head of a user by using a spectacle-type accessory or the like (see Patent Literature 5).

A control unit 50 has a controller 51, an operating unit 52, an external interface (I/F) 53, an R laser driver 54, a G laser driver 55, a B laser driver 56 and a two-dimensional scanning driver 57. The controller 51 is formed of a microcomputer that includes a CPU, a ROM, a RAM and the like. The controller 51 generates an R signal, a G signal, a B signal, a horizontal signal and a vertical signal for forming an image on the basis of the image data that is supplied from an external apparatus such as a PC via the external I/F 53. The controller 51 transmits the R signal to the R laser driver 54, the G signal to the G laser driver 55 and the B signal to the B laser driver 56, respectively. In addition, the controller 51 transmits the horizontal signal and the vertical signal to the two-dimensional scanning driver 57 and controls the current to be applied to the magnetic field generator 30, and thus controls the operation of the movable mirror portion 10.

The R laser driver 54 drives the red laser 42 so that red laser light, of which the light amount is in accordance with the R signal from the controller 51, is generated. The G laser driver 55 drives the green laser 43 so that green laser light, of which the light amount is in accordance with the G signal from the controller 51, is generated. The B laser driver 56 drives the blue laser 44 so that blue laser light, of which the light amount is in accordance with the B signal from the controller 51, is generated. It becomes possible to generate a laser beam having a desired color by adjusting the intensity ratio of the laser beams of the respective colors.

The laser beams respectively generated by the red laser 42, the green laser 43 and the blue laser 44 are multiplexed by the optical multiplexer 41, and after that two-dimensionally scanned by the movable mirror portion 10. The scanned multiplexed laser beam is reflected from a concave reflecting mirror 58 and passes through the pupil 59 so as to form an image on a retina 60.

In the embodiment of the present invention, a hard magnetic thin film 22 is used in the movable mirror portion 20, and in particular, the hard magnetic thin film 22 has a coercive force of 100 kA/m or greater, which is desirable for two-dimensional scanning in such a manner that the ratio of the magnetic field generated by the magnetic field generator 30 to the coercive force becomes 0.2 or less, and therefore, a sufficient rotational force in the magnetic field can be secured only by using a thin film without deteriorating the mirror characteristics, and thus, the movable mirror portion 20 can be miniaturized without making the structure thereof complex. Unlike the movable magnet systems disclosed in Patent Literature 3 and Non-Patent Literature 1, it is not necessary to embed a magnet in the periphery of the mirror, and thus, the structure of the movable mirror portion can be simplified, which makes it possible to miniaturize the movable mirror portion.

Example 1

Figure 8:
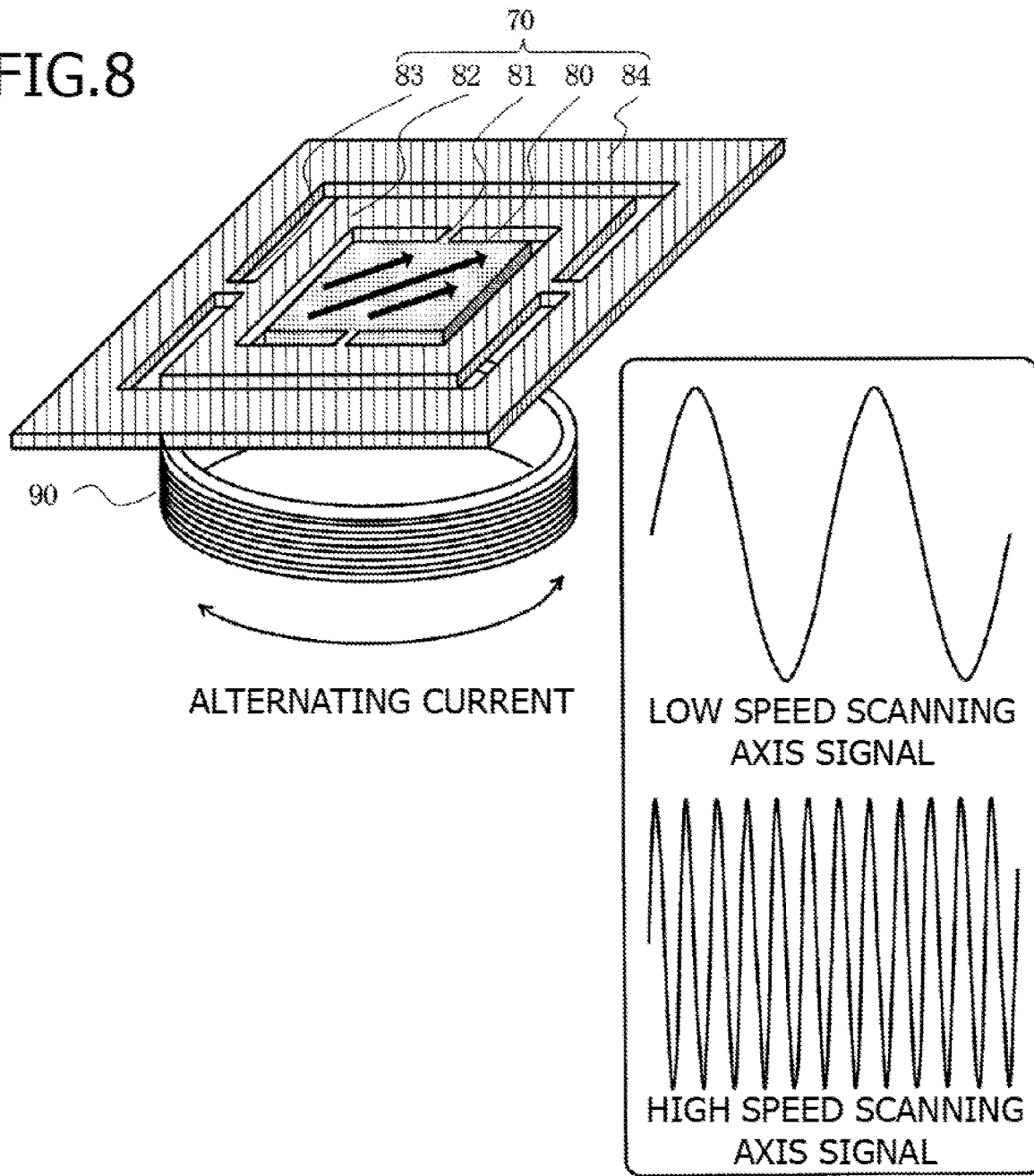
FIG. 8 is a schematic perspective diagram illustrating the two-dimensional optical scanning mirror device according to Example 1 of the present invention.

Next, the two-dimensional optical scanning mirror device according to Example 1 of the present invention is described in reference to FIGS. 8 through 13. FIG. 8 is a schematic perspective diagram illustrating the two-dimensional optical scanning mirror device according to Example 1 of the present invention, which is provided with a movable mirror portion 70 and a solenoid coil 90 for driving the movable mirror portion 70. The movable mirror portion 70 has a reflection portion 80, a rotational outer frame 82 for supporting the reflection portion 80 with a pair of hinges 81, and a non-rotational outer frame 84 for supporting the rotational outer frame 82 with a pair of hinges 83 that is provided in the direction that is orthogonal to the hinges 81.

In this case, the hinges 81 provide a rotation axis for high speed scanning, and the hinges 83 provide a rotational axis for low speed scanning. The hard magnetic thin film made of an Fe—Pt thin film provided on the reflection portion 80 is magnetized in the direction that is at 45° relative to the rotational axis for high speed scanning and the rotational axis for low speed scanning that are orthogonal to each other. Thus, the magnetization direction is inclined by 45° relative to the two scanning axes, and thereby, two axial scanning becomes possible by using a single solenoid coil 90. In this case, concerning the lines of magnetic force due to the magnetization of the movable mirror portion 70 that is inclined by 45° relative to the respective scanning axes, the components of the lines that are orthogonal to the respective scanning axes cause repulsion and attraction from and to the magnetic field of the solenoid coil 90, and thus cause reciprocal vibrations within a certain angle around the respective scanning axes.

The point where two axial scanning is carried out using only the magnetic force as described above characterizes the two-dimensional optical scanning mirror device according to Example 1 of the present invention. As illustrated in FIG. 8, the alternating current that is made to flow through the solenoid coil 90 is obtained by overlapping a low speed scanning axis signal having a low frequency and a high speed scanning axis signal having a high frequency.

Concerning the high speed scanning, the scanning frequency thereof can be adjusted so as to become approximate to the inherent rotational frequency (determined by the shape and mass of the mirror portion, the spring constant of the rotation axis and the like) around the hinges 81 that provide a rotation axis of the movable mirror portion 70 so that the mirror can be rotated efficiently. Concerning the low speed scanning, it is not necessary to make the scanning frequency approximate to the inherent frequency of the rotation around the hinges 83 that provide the rotation axis for low speed scanning in order to make the low speed scanning possible. Here, the scanning frequency that is approximate to the inherent frequency of the rotation around the rotation axis for low speed scanning can of course be used.

Though the reflection portion 80 is supported by the hinges 81 that provide a rotation axis for high speed scanning and the rotational outer frame 82 is supported by the hinges 83 that provide a rotation axis for low speed scanning in this structure, conversely, the projection portion 80 may be supported by the hinges 81 that provide a rotation axis for low speed scanning and the rotational outer frame 82 by the hinges 83 that provide a rotation axis for high speed scanning in the structure.

Figure 9A:
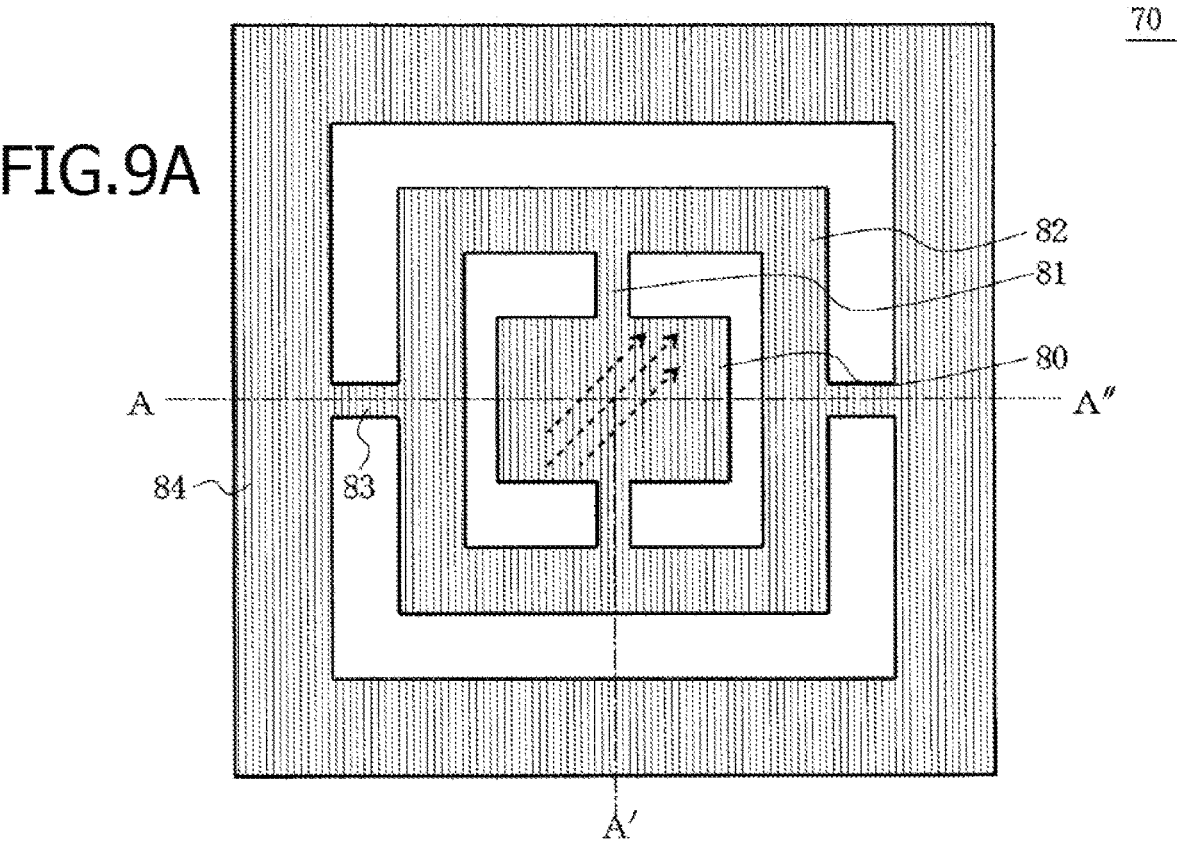
FIGS. 9A and 9B are schematic diagrams illustrating the movable mirror portion of the two-dimensional optical scanning mirror device according to Example 1 of the present invention.
Figure 9B:
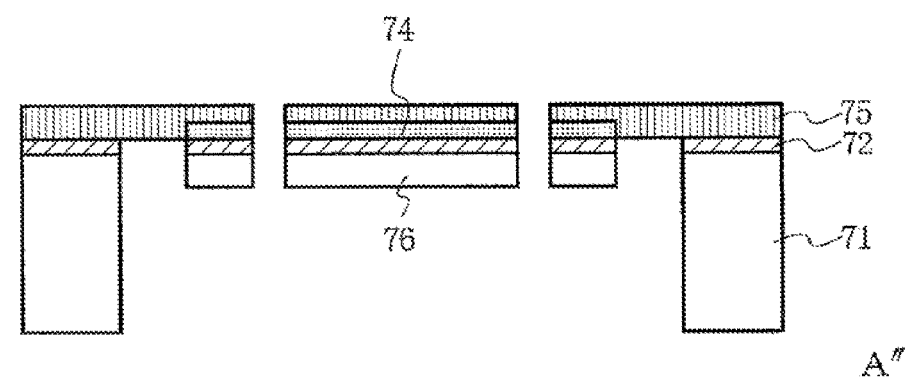

FIGS. 9A and 9B are schematic diagrams illustrating the movable mirror portion of the two-dimensional optical scanning mirror device according to Example 1 of the present invention. FIG. 9A is an upper diagram, and FIG. 9B is a cross-sectional diagram along the single-dotted chain line connecting A and A" in FIG. 9A. Though the size of the reflection portion 80 and the entire size of the movable mirror portion 70 can be arbitrary, the size of the reflection portion 80 is 500 μm×300 μm, and the size of the movable mirror portion 70 is 2.7 mm×2.5 mm. A Si substrate 71 is used to provide an $Fe_{56}Pt_{44}$ thin film 74 with a $SiO_2$ film 72 in between, and the reflection portion 80, the hinges 81, the rotational outer frame 82, the hinges 83 and the non-rotational outer frame 84 are formed of a metal glass film 75. Here, a part of the Si layer remains on the opposite surface of the $SiO_2$ film that makes contact with the $Fe_{56}Pt_{44}$ thin film 74 as a mirror base substrate 76 for maintaining the mechanical strength.

Figure 10A:
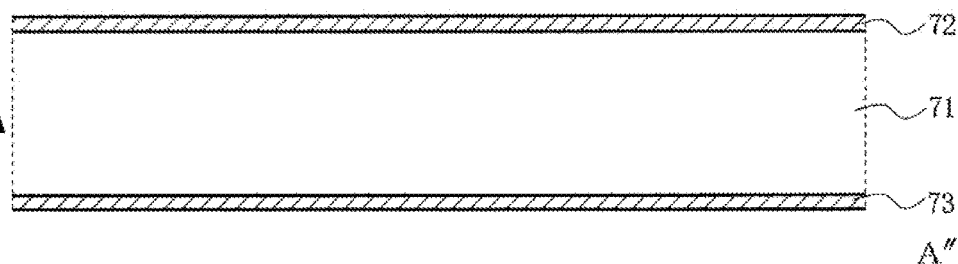
FIGS. 10A through 10C are diagrams illustrating the movable mirror portion of the two-dimensional optical scanning mirror device according to Example 1 of the present invention during the manufacturing process up to a certain point before completion.

Next, the manufacturing process for the movable mirror portion of the two-dimensional optical scanning mirror device according to Example 1 of the present invention is described in reference to FIGS. 10A through 10I. First, as illustrated in FIG. 10A, a silicon substrate 71 having a thickness of 500 μm and of which the main surface is (100) plane is heated at 1,000° C. for one hour in the air so as to form $SiO_2$ films 72 and 73 having a thickness of 10 nm to 150 nm. Here, the film thickness of the $SiO_2$ film 72 is 100 nm.

Figure 10B:
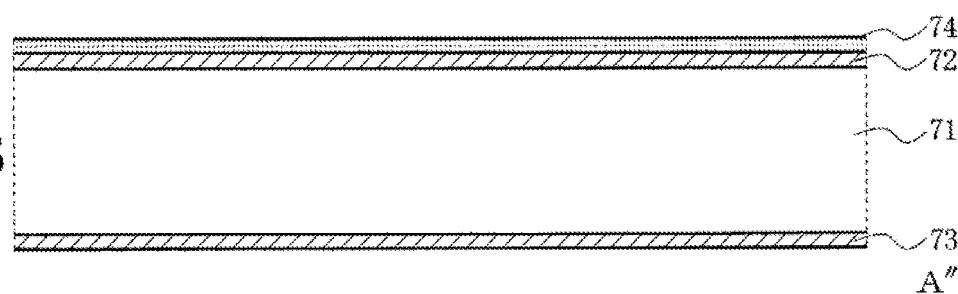

Next, as illustrated in FIG. 10B, an $Fe_{56}Pt_{44}$ thin film 74 having a thickness of 142 nm is deposited in accordance with an electron beam heating vapor deposition method. Then, the $Fe_{56}Pt_{44}$ thin film 74 is annealed through irradiation with infrared rays in a vacuum so as to be converted to an alloy. Here, the temperature for heating is 650° C. and the time for heating is 15 minutes. Next, the $Fe_{56}Pt_{44}$ thin film 74 is magnetized by applying a magnetic field in the <011> direction of the Si substrate 71. Here, the intensity of the magnetic field for magnetization is 5 tesla and the time for magnetization is three minutes.

Figure 10C:
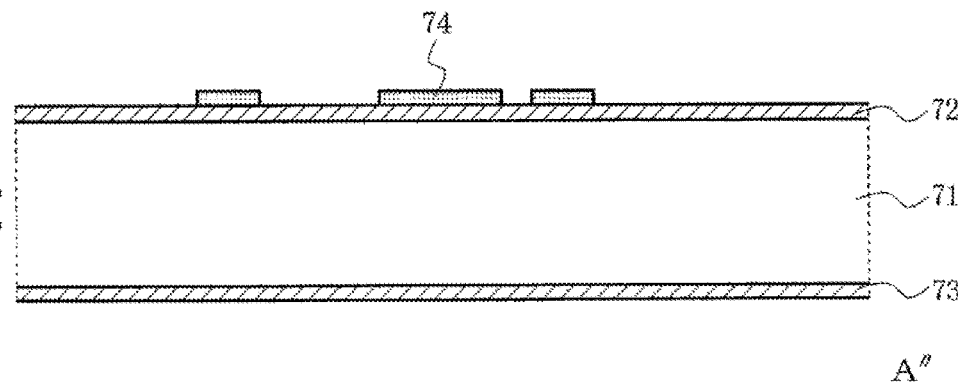
Figure 10D:
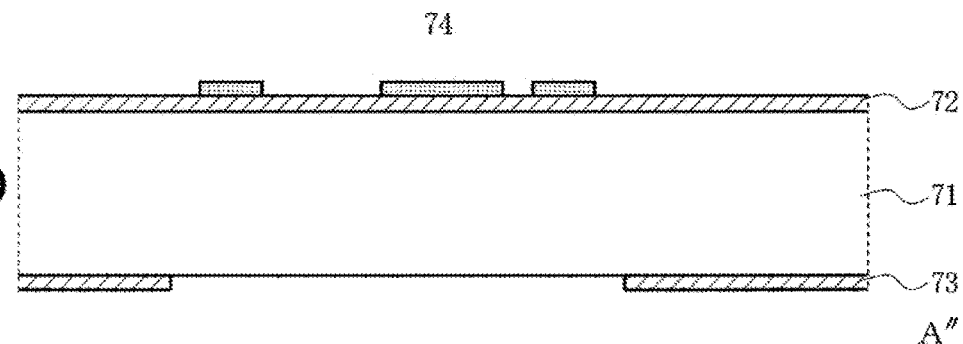
FIGS. 10D through 10F are diagrams illustrating the movable mirror portion of the two-dimensional optical scanning mirror device according to Example 1 of the present invention during the manufacturing process after the point in FIG. 10C and up to another point before completion.

Next, as illustrated in FIG. 10C, the $Fe_{56}Pt_{44}$ thin film 74 is processed in accordance with an ion milling method to a shape that corresponds to the rotational outer frame 82 and the reflection portion 80 illustrated in FIG. 8. At this time, the directions of the hinges 81 and 83, that is to say, the optical scanning rotational axes of the mirror portion, are made to be the same as the <010> direction of the Si substrate 71, and thereby, the direction of the magnetization is at 45 degrees relative to the hinges 81 and 83. Then, as illustrated in FIG. 10D, a buffered HF solution is used to remove the $SiO_2$ film 73 through etching so that the $SiO_2$ film 73 remains only in the outer peripheral portion of the Si substrate 71.

Figure 10E:
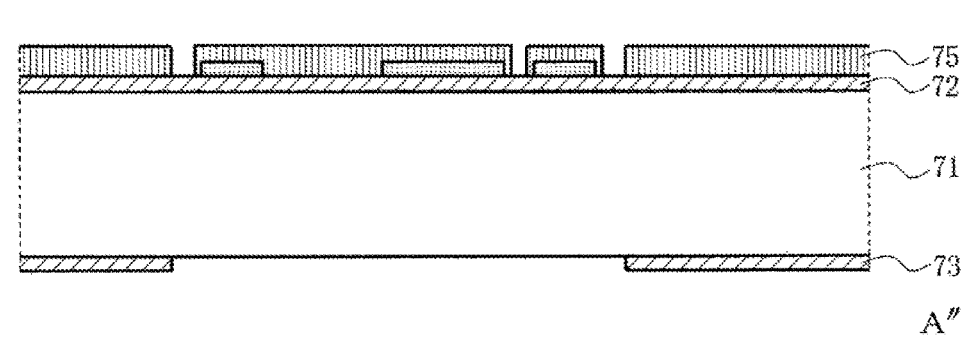

Next, as illustrated in FIG. 10E, a metal glass film 75 having such a shape as to correspond to the reflection portion 80, the hinges 81, the rotational outer frame 82, the hinges 83 and the non-rotational outer frame 84 is formed in accordance with a lift-off method. The metal glass film 75 is formed as a film of $Zr_{75}Cu_{30}Al_{10}Ni_5$ having a thickness of 10 μm in accordance with a sputtering method in an atmosphere of which the pressure has been reduced to 0.4 Pa. Here, the thickness of the metal glass film 75 depends on the inherent rotational frequency that is determined by the shape and mass of the reflection portion 20, the spring constant of the rotational portion and the like and is approximately 2 μm to 50 μm, and is 10 μm in this example.

Figure 10F:
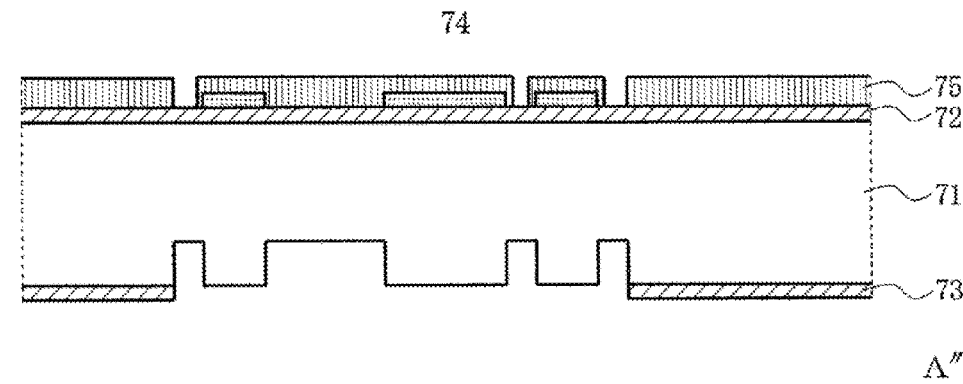
Figure 10G:
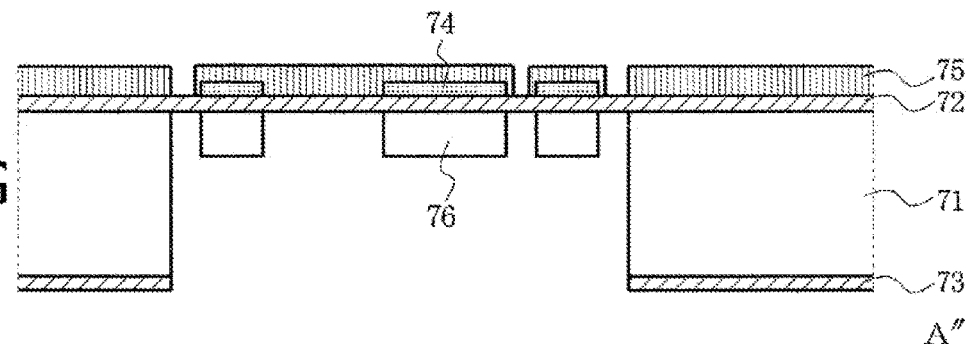
FIGS. 10G through 10I are diagrams illustrating the movable mirror portion of the two-dimensional optical scanning mirror device according to Example 1 of the present invention during the manufacturing process after the point in FIG. 10F.

Next, as illustrated in FIG. 10F, the Si substrate 71 is etched on the bottom side so as to correspond to the pattern of the $Fe_{56}Pt_{44}$ thin film 74. Then, as illustrated in FIG. 10G, the $SiO_2$ film 73 is used as a mask to dry etch the Si substrate 71 on the bottom side so that the $SiO_2$ film 72 is partially exposed. At this time, a Si layer having a thickness of approximately 100 nm remains on the bottom side of the $Fe_{56}Pt_{44}$ thin film 74 as the mirror base substrate 76.

Figure 10H:
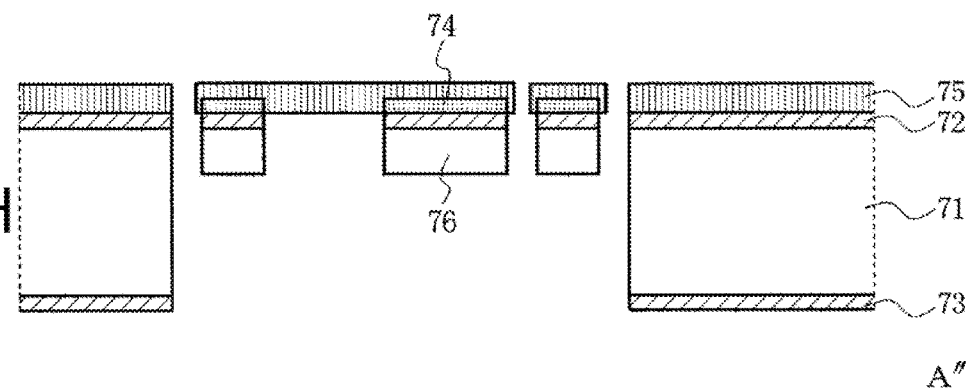
Figure 10I:
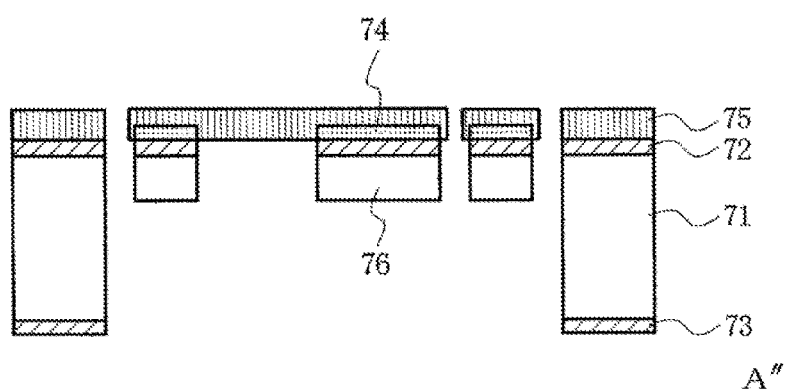

Next, as illustrated in FIG. 10H, a buffered HF solution is used to completely etch away the exposed portion of the $SiO_2$ film so that only the metal glass film 75 remains to provide the hinges 81 and 83. Then, as illustrated in FIG. 10I, the Si substrate 71 is diced so as to cut out a two-dimensional optical scanning mirror device, and thus, the basic structure of the movable mirror portion 70 of the two-dimensional scanning mirror device according to Example 1 of the present invention is complete.

Figure 11:
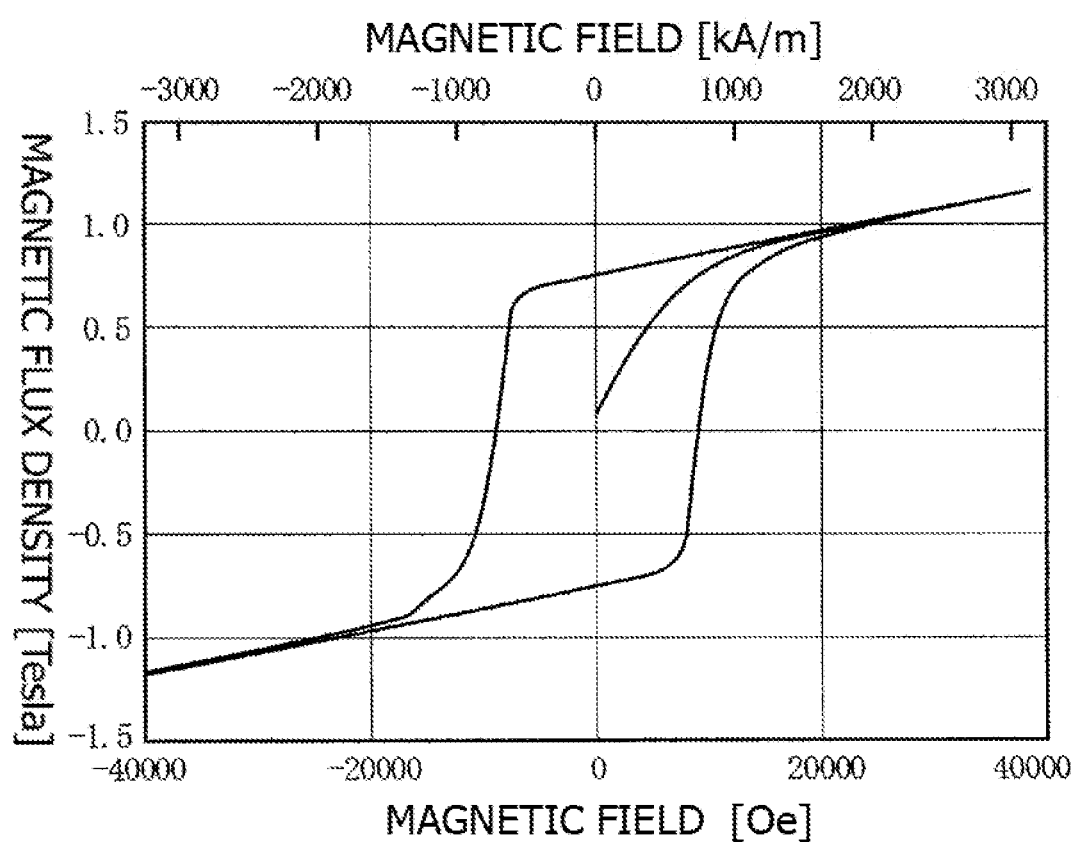
FIG. 11 illustrates a magnetic hysteresis curve for the $Fe_{56}Pt_{44}$ film fabricated in Example 1.

FIG. 11 illustrates a magnetic hysteresis curve for the $Fe_{56}Pt_{44}$ film fabricated in Example 1. As illustrated in FIG. 11, the in-plane direction coercive force is 800 kA/m (approximately 10 kOe), and the residual magnetization is approximately 0.8 tesla, and thus, a sufficient coercive force is gained by using only a thin film. In addition, the squareness ratio(=residual magnetic flux density Br/maximum magnetic flux density Bm)≈0.82.

As illustrated in FIG. 8, a two-dimensional optical scanning mirror device is provided by installing a solenoid coil 90 beneath the movable mirror portion 70. As for the size of the solenoid coil 90, the outer diameter is 5 mm, the height is 3 mm and the number of turns of the wire is 800. The solenoid coil 90 makes direct connection on the Si substrate 71 in the outer periphery of the movable mirror portion 70 with an adhesive in between and is fixed with the adhesive in such a state that the center portion of the solenoid coil 90 becomes the same as the center of the reflection portion.

This two-dimensional optical scanning mirror device was actually irradiated with a laser beam so that the reflected beam was projected onto the screen, and thus, the deflection angle of the light beam was evaluated. As a result, the deflection angle of the beam at 30° in the longitudinal direction and at 5° in the lateral direction was obtained with an operational voltage of 2 V.

How the characteristics were affected by the external environment and the repetitive use of the mirror was checked. The selected factors of the concrete external environment were the temperature of the outside air and the external magnetic field, and changes in the characteristics in response to the respective factors were found. As a result, no changes were found in the characteristics even when the external temperature rose. In addition, no changes in the characteristics were perceived even after a bar magnet for science education (the magnitude of the magnetic field was approximately 50 kA/m) was made to approach the optical mirror device as an external magnetic field. Meanwhile, changes in the operational characteristics after an optical scanning mirror device had continuously been in operation for one month were checked in order to check how the repetitive use affected the mirror. As a result, the deflection angle of the beam at 30° in the longitudinal direction and 5° in the lateral direction was gained with an operational voltage of 2 V, and thus, the operational characteristics were not perceived as having deteriorated even after the continuous operation for one month before the deflection angle of the light beam was evaluated.

For the sake of comparison, the characteristics of a two-dimensional optical scanning mirror device that had been fabricated without annealing treatment after the formation of an $Fe_{56}Pt_{44}$ thin film in the same manner as in Example 1 were evaluated. In this case, the coercive force was 10 kA/m, and the characteristics of the optical scanning mirror device immediately after fabrication were the same as in the case where annealing treatment was carried out to make the coercive force 800 kA/m. However, the deflection angle of the beam at 15° in the longitudinal direction and at 1° in the lateral direction was gained with an applied voltage of 2 V when the characteristics were measured after a bar magnet for science education (the magnitude of the magnetic field was approximately 50 kA/m) was made to approach the two-dimensional optical scanning mirror device as an external magnetic field. In this case, the characteristics of the optical scanning mirror device were worse when affected by an external magnetic field as a factor of the external environment as compared to that where the magnetic thin film had been annealed. In addition, the operational characteristics were perceived to have deteriorated after the two-dimensional optical scanning mirror device had continuously been in operation for one month.

For the sake of further comparison, the characteristics of a two-dimensional optical scanning mirror device that had been fabricated by carrying out annealing treatment after the formation of an $Fe_{56}Pt_{44}$ thin film that was the same as in Example 1 and then irradiating the film with $^{20}Ne^+$ ions of 180 keV at room temperature were evaluated. In this case, the coercive force was 100 kA/m. The deflection angle of the beam at 30° in the longitudinal direction and at 5° in the lateral direction was gained with an applied voltage of 2 V, and thus, the same characteristics were gained as an optical scanning mirror device where the magnetic thin film had been annealed. In addition, the deflection angle of the beam at 30° in the longitudinal direction and at 5° in the lateral direction was gained with an applied voltage of 2 V when the characteristics were measured after a bar magnet for science education (the magnitude of the magnetic field was approximately 50 kA/m) was made to approach the optical mirror device as an external magnetic field. In this case as well, the same characteristics were gained as an optical mirror scanning device where the magnetic thin film had been annealed. The operational characteristics of the optical scanning mirror device were not perceived to have deteriorated after continuous operation for one month.

It was found from these results that the coercive force of a magnetic thin film is not affected by a change in the general external environment such as the temperature and an external magnetic field or the repetitive use of the mirror as long as it is 100 kA/m or greater, and thus, it was clarified that the coercive force was an important parameter for the characteristics of an electromagnetic drive type optical scanning mirror when practically used. It could also be clarified that a coercive force of 100 kA/m or greater is actually required in the case where the two-dimensional optical scanning mirror device is miniaturized as illustrated in Example 1.

A hard magnetic film is used for the magnetic body in Example 1, and therefore, a sufficient coercive force and a rotational force in a magnetic field can be secured even with a thin film. As a result, the structure of the movable mirror portion can be simplified and miniaturized without the mirror characteristics being deteriorated, and thus, it becomes possible to miniaturize the entire size of the two-dimensional optical scanning mirror device.

Example 2

Figure 12A:
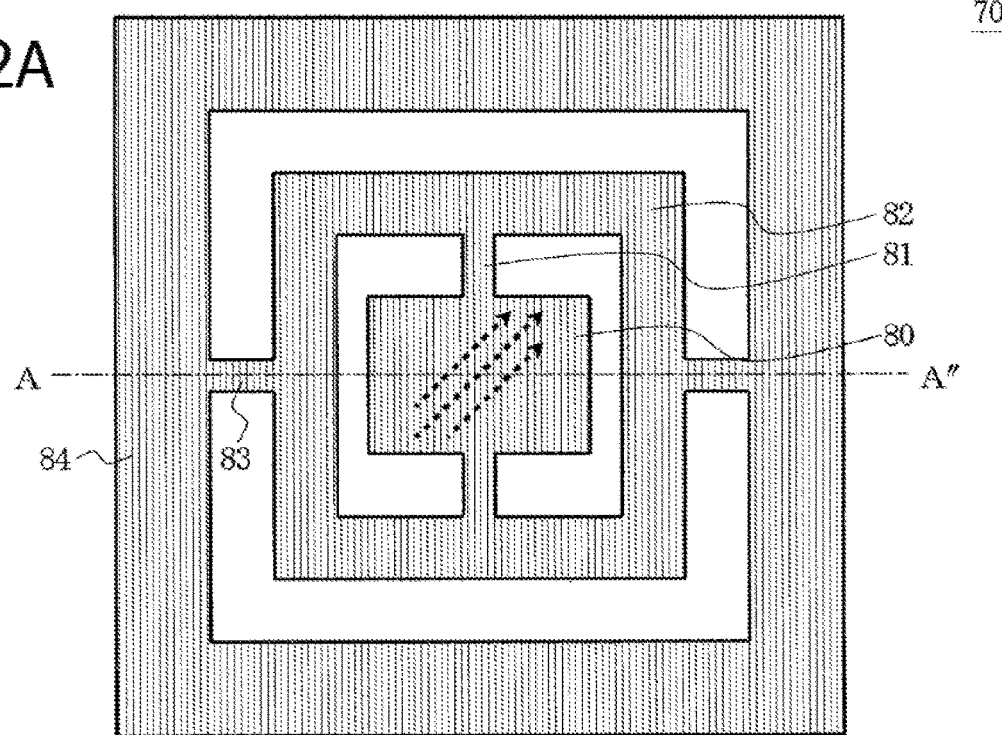
FIGS. 12A and 12B are schematic diagrams illustrating the movable mirror portion of the two-dimensional optical scanning mirror device according to Example 2 of the present invention.
Figure 12B:
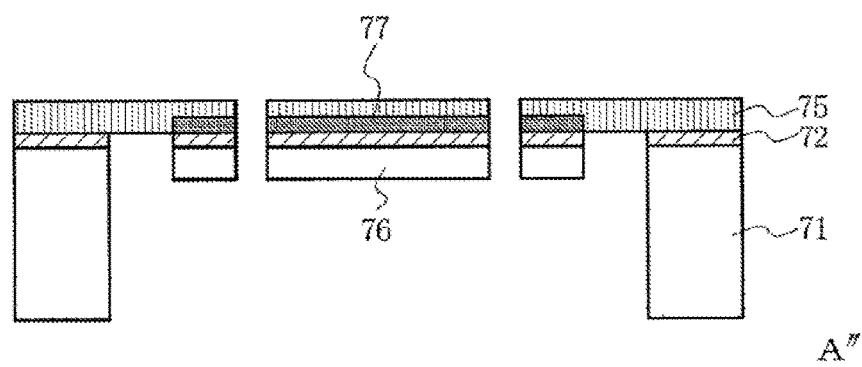

Next, the two-dimensional optical scanning mirror device according to Example 2 of the present invention is described in reference to FIGS. 12A and 12B and is the same as that in Example 1, except that a $Co_{80}Pt_{20}$ thin film is used instead of the $Fe_{56}Pt_{44}$ thin film as the hard magnetic thin film, and therefore, only the structure of the movable mirror portion is illustrated. FIGS. 12A and 12B are schematic diagrams illustrating the movable mirror portion of the two-dimensional optical scanning mirror device according to Example 2 of the present invention. FIG. 12A is an upper diagram, and FIG. 12B is a cross-sectional diagram along the single-dotted chain line connecting A and A" in FIG. 12A. Though the size of the reflection portion 80 and the entire size of the movable mirror portion 70 are arbitrary, the size of the reflection portion 80 is 500 μm×300 μm, and the size of the movable mirror portion is 2.7 mm×2.5 mm. A Si substrate 71 is used to provide a $Co_{80}Pt_{20}$ thin film 77 having a thickness of 160 nm with a $SiO_2$ film 72 in between. A reflection portion 80, hinges 81, a rotational outer frame 82, hinges 83 and a non-rotational outer frame 44 are formed of a metal glass film 75. Here, a Si layer is provided as a mirror base substrate 76 on the opposite side of the $SiO_2$ film contacting the $Co_{80}Pt_{20}$ thin film 77.

Annealing treatment was carried out in a vacuum at a temperature of 670° C. for 15 minutes on the $Co_{80}Pt_{20}$ thin film 77 after the formation of the film. The coercive force of the $Co_{80}Pt_{20}$ thin film 77 in the plane direction was approximately 200 kA/m. In addition, the residual magnetization was approximately 0.6 tesla. Furthermore, the $Co_{80}Pt_{20}$ thin film 77 was magnetized with the intensity of the magnetic field of 5 tesla, and the time for magnetization was three minutes.

In the same manner as in FIG. 8, a solenoid coil having the same structure was installed in the two-dimensional optical scanning mirror device in Example 2. As for the size of the coil, the outer diameter was 5 mm, the height was 3 mm and the number of turns of the wire was 800. This two-dimensional optical scanning mirror device was irradiated with a laser beam so that the reflected light was projected onto a screen, and the deflection angle of the light beam was evaluated, and then, the same effects as in Example 1 were gained. In addition, the characteristics were measured after a bar magnet for science education (the magnitude of the magnetic field was approximately 50 kA/m) was made to approach the two-dimensional optical scanning mirror device as an external magnetic field, and then, a slight deterioration of the characteristics was observed. Concerning the operational characteristics after the two-dimensional optical scanning mirror device had been in operation for one month, though a deterioration of the operational characteristics was perceived, it was in a range that does not affect practical use. It can be seen from these results that the two-dimensional optical scanning mirror device is not affected by a change in the general external environment such as the temperature or an external magnetic field or the repetitive use of the mirror as long as the coercive force of the magnetic thin film is 100 kA/m or greater.

Example 3

Figure 13A:
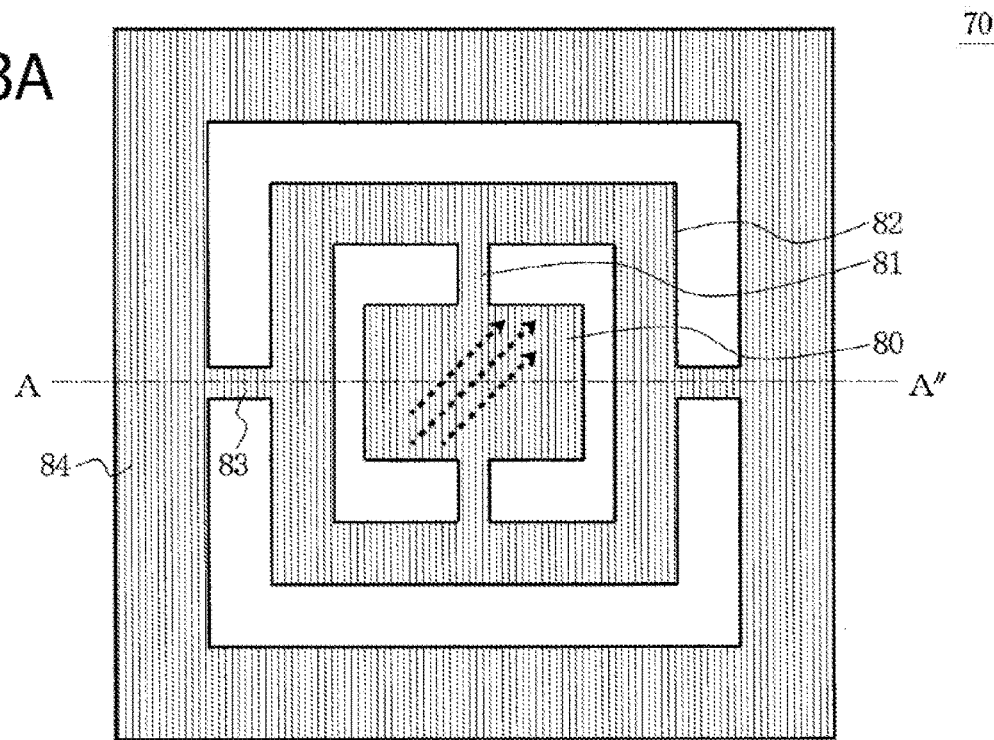
FIGS. 13A and 13B are schematic diagrams illustrating the movable mirror portion of the two-dimensional optical scanning mirror device according to Example 3 of the present invention.
Figure 13B:
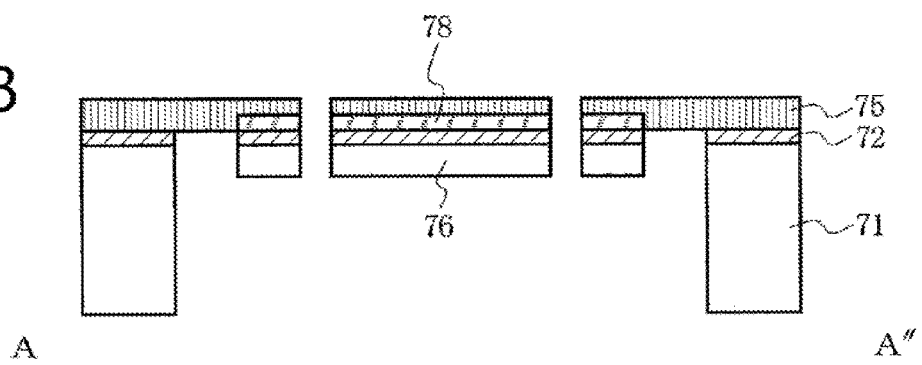

Next, the two-dimensional optical scanning mirror device according to Example 3 of the present invention is described in reference to FIGS. 13A and 13B and is the same as that in Example 1, except that a $Co_{80}Pd_{20}$ thin film is used instead of the $Fe_{56}Pt_{44}$ thin film as the hard magnetic thin film, and therefore, only the structure of the movable mirror portion is illustrated. FIGS. 13A and 13B are schematic diagrams illustrating the movable mirror portion of the two-dimensional optical scanning mirror device according to Example 3 of the present invention. FIG. 13A is an upper diagram, and FIG. 13B is a cross-sectional diagram along the single-dotted chain line connecting A and A" in FIG. 13A. Though the size of the reflection portion 80 and the entire size of the movable mirror portion 70 are arbitrary, the size of the reflection portion 80 is 500 µm×300 µm, and the size of the movable mirror portion is 2.7 mm×2.5 mm. A Si substrate 71 is used to provide a $Co_{80}Pd_{20}$ thin film 78 having a thickness of 150 nm with a $SiO_2$ film 72 in between. A reflection portion 80, hinges 81, a rotational outer frame 82, hinges 83 and a non-rotational outer frame 44 are formed of a metal glass film 75. Here, a Si layer is provided as a mirror base substrate 76 on the opposite side of the $SiO_2$ film contacting the $Co_{80}Pd_{20}$ thin film 78.

Annealing treatment was carried out in a vacuum at a temperature of 650° C. for 15 minutes on the $Co_{80}Pd_{20}$ thin film 78 after the formation of the film. The coercive force of the $Co_{80}Pd_{20}$ thin film 78 in the plane direction was approximately 160 kA/m. In addition, the residual magnetization was approximately 0.5 tesla. Furthermore, the $Co_{80}Pd_{20}$ thin film 78 was magnetized with the intensity of the magnetic field of 5 tesla, and the time for magnetization was three minutes.

In the same manner as in FIG. 8, a solenoid coil having the same structure was installed in the two-dimensional optical scanning mirror device in Example 3. As for the size of the coil, the outer diameter was 5 mm, the height was 3 mm and the number of turns of the wire was 800. This two-dimensional optical scanning mirror device was irradiated with a laser beam so that the reflected light was projected onto a screen, and the deflection angle of the light beam was evaluated, and then, the same effects as in Example 1 were gained. In addition, the characteristics were measured after a bar magnet for science education (the magnitude of the magnetic field was approximately 50 kA/m) was made to approach the two-dimensional optical scanning mirror device as an external magnetic field, and then, a slight deterioration of the characteristics was observed. Concerning the operational characteristics after the two-dimensional optical scanning mirror device had been in operation for one month, though a deterioration of the operational characteristics was perceived, it was in a range that does not affect practical use. It can be seen from these results that the two-dimensional optical scanning mirror device is not affected by a change in the general external environment such as the temperature or an external magnetic field or the repetitive use of the mirror as long as the coercive force of the magnetic thin film is 100 kA/m or greater.

Example 4

Figure 14A:
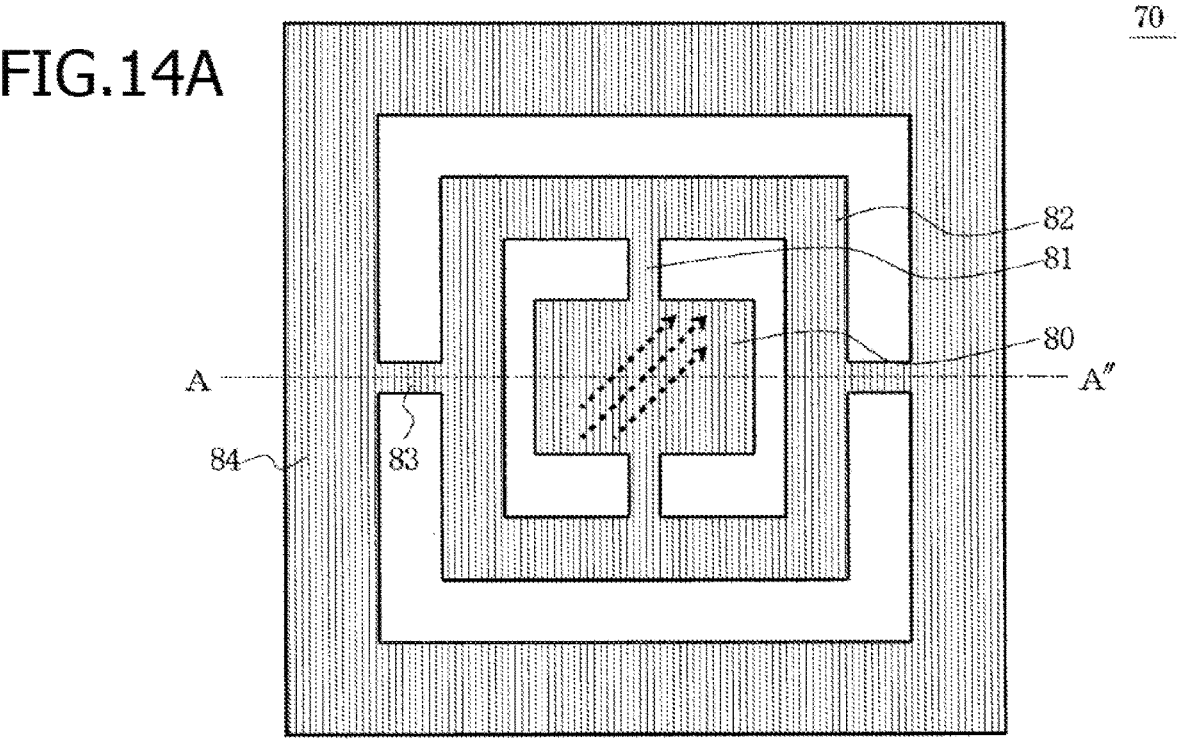
FIGS. 14A and 14B are schematic diagrams illustrating the movable mirror portion of the two-dimensional optical scanning mirror device according to Example 4 of the present invention.
Figure 14B:
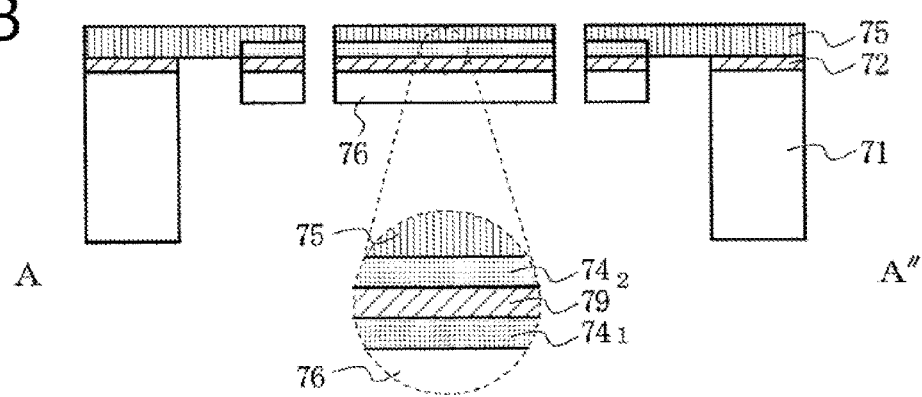

Next, the two-dimensional optical scanning mirror device according to Example 4 of the present invention is described in reference to FIGS. 14A and 14B and is the same as that in Example 1, except that an $Fe_{56}Pt_{44}$ thin film having a two-layer structure is used instead of the $Fe_{56}Pt_{44}$ thin film having a single layer structure as the hard magnetic thin film, and therefore, only the structure of the movable mirror portion is illustrated. FIGS. 14A and 14B are schematic diagrams illustrating the movable mirror portion of the two-dimensional optical scanning mirror device according to Example 4 of the present invention. FIG. 14A is an upper diagram, and FIG. 14B is a cross-sectional diagram along the single-dotted chain line connecting A and A" in FIG. 14A. Though the size of the reflection portion 80 and the entire size of the movable mirror portion 70 are arbitrary, the size of the reflection portion 80 is 500 µm×300 µm, and the size of the movable mirror portion is 2.7 mm×2.5 mm.

A Si substrate 71 is used to provide an $Fe_{56}Pt_{44}$ thin film 74$_1$ having a thickness of 140 nm, a $SiO_2$ film 79 having a thickness of 70 nm, and an $Fe_{56}Pt_{44}$ thin film 74$_2$ having a thickness of 140 nm with a $SiO_2$ film 72 in between. A reflection portion 80, hinges 81, a rotational outer frame 82, hinges 83 and a non-rotational outer frame 44 are formed of a metal glass film 75. Here, a Si layer is provided as a mirror base substrate 76 on the opposite side of the $SiO_2$ film 72 contacting the $Fe_{56}Pt_{44}$ thin film 74$_1$.

In this case, the coercive force in the plane direction and the residual magnetization were approximately the same as in the case of Example 1, and the characteristics that are better as compared to Example 1 were gained in terms of the deflection angle of the beam. Here, the magnetic field generated outside becomes greater when the hard magnetic thin film is made to have a two-layer structure as in Example 4.

Example 5

Figure 15A:
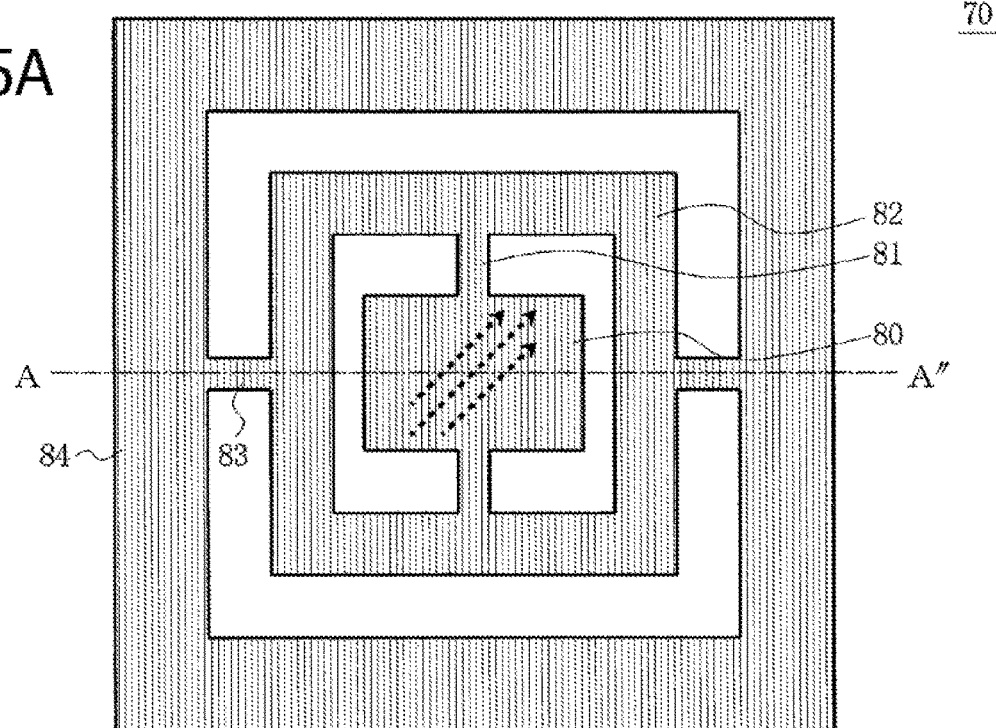
FIGS. 15A and 15B are schematic diagrams illustrating the movable mirror portion of the two-dimensional optical scanning mirror device according to Example 5 of the present invention.
Figure 15B:
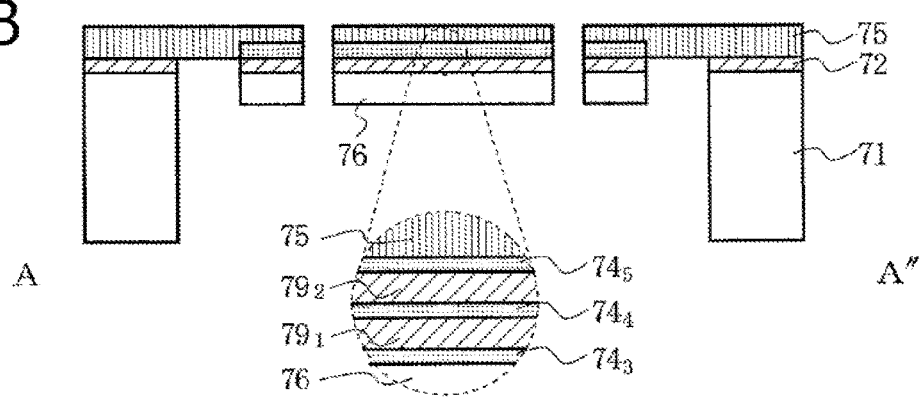

Next, the two-dimensional optical scanning mirror device according to Example 5 of the present invention is described in reference to FIGS. 15A and 15B and is the same as that in Example 1, except that an $Fe_{56}Pt_{44}$ thin film having a multilayer structure is used instead of the $Fe_{56}Pt_{44}$ thin film having a single layer structure as the hard magnetic thin film, and therefore, only the structure of the movable mirror portion is illustrated. FIGS. 15A and 15B are schematic diagrams illustrating the movable mirror portion of the two-dimensional optical scanning mirror device according to Example 5 of the present invention. FIG. 15A is an upper diagram, and FIG. 15B is a cross-sectional diagram along the single-dotted chain line connecting A and A" in FIG. 15A. Though the size of the reflection portion 80 and the entire size of the movable mirror portion 70 are arbitrary, the size of the reflection portion 80 is 500 µm×300 µm, and the size of the movable mirror portion is 2.7 mm×2.5 mm.

An $Fe_{56}Pt_{44}$ thin film 74$_3$ having a thickness of 120 nm, a $SiO_2$ film 79$_1$ having a thickness of 70 nm, an $Fe_{56}Pt_{44}$ thin film 74$_4$ having a thickness of 120 nm, a $SiO_2$ film 79$_2$ having a thickness of 5 nm, and an $Fe_{56}Pt_{44}$ thin film $74_5$ having a thickness of 120 nm were sequentially formed on a Si substrate 71 with a $SiO_2$ film 72 in between. A reflection portion 80, hinges 81, a rotational outer frame 82, hinges 83 and a non-rotational outer frame 44 are formed of a metal glass film 75. Here, a Si layer is provided as a mirror base substrate 76 on the opposite side of the $SiO_2$ film 72 contacting the $Fe_{56}Pt_{44}$ thin film $74_1$.

In this case, the coercive force in the plane direction and the residual magnetization were approximately the same as in the case of Example 1, and the characteristics that are better as compared to Example 1 were gained in terms of the deflection angle of the beam. Furthermore, the same characteristics were gained in the case where the hard magnetic thin film has a four-layer structure with $SiO_2$ films in between. A magnetic field generated outside becomes greater when the hard magnetic thin film has a multilayer structure as in Example 5.

Example 6

Figure 16A:
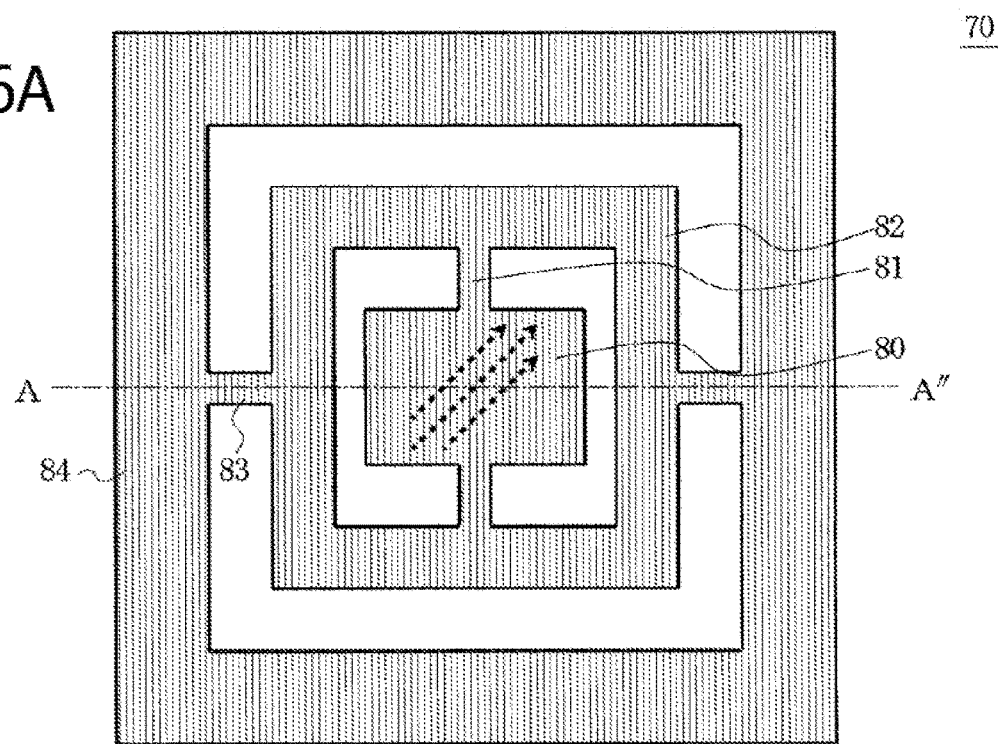
FIGS. 16A and 16B are schematic diagrams illustrating the movable mirror portion of the two-dimensional optical scanning mirror device according to Example 6 of the present invention.
Figure 16B:
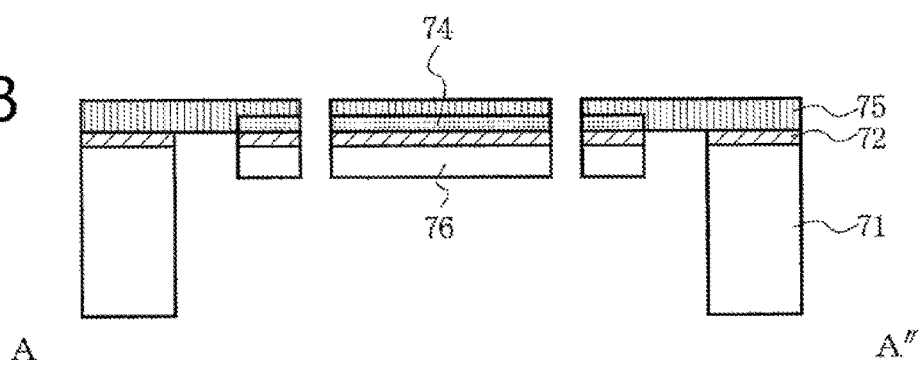

Next, the two-dimensional optical scanning mirror device according to Example 6 of the present invention is described in reference to FIGS. 16A and 16B and is the same as that in Example 1, except the thickness of the $Fe_{56}Pt_{44}$ thin film, and therefore, only the structure of the movable mirror portion is illustrated. FIGS. 16A and 16B are schematic diagrams illustrating the movable mirror portion of the two-dimensional optical scanning mirror device according to Example 6 of the present invention. FIG. 16A is an upper diagram, and FIG. 16B is a cross-sectional diagram along the single-dotted chain line connecting A and A" in FIG. 16A. Though the size of the reflection portion 80 and the entire size of the movable mirror portion 70 are arbitrary, the size of the reflection portion 80 is 500 μm×300 μm, and the size of the movable mirror portion is 2.7 mm×2.5 mm.

Here, the thickness of the $Fe_{56}Pt_{44}$ thin film 74 was 88 nm, 210 nm, 460 nm or 580 nm. The thicker the thin film is, the lower the drive voltage is for obtaining the same deflection angle of the beam as in Example 1. However, the basic characteristics are the same as in Example 1.

Example 7

Figure 17A:
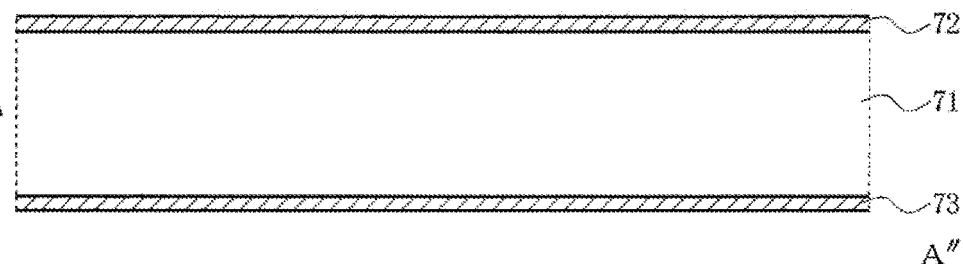
FIGS. 17A through 17C are diagrams illustrating the movable mirror portion of the two-dimensional optical scanning mirror device according to Example 7 of the present invention during the manufacturing process up to a certain point before completion.

Next, the two-dimensional optical scanning mirror device according to Example 7 of the present invention is described in reference to FIGS. 17A through 17I, which is the same as that in Example 1 except for the manufacturing process procedures, and therefore, only the manufacturing process is described. First, as illustrated in FIG. 17A, a silicon substrate 71 having a thickness of 0.4 mm and of which the main surface is (100) plane is heated at 1000° C. for one hour in the air so that the $SiO_2$ films 72 and 73 having a thickness of 10 nm to 100 nm are formed. Here, the thickness of the $SiO_2$ film 72 is 100 nm.

Figure 17B:
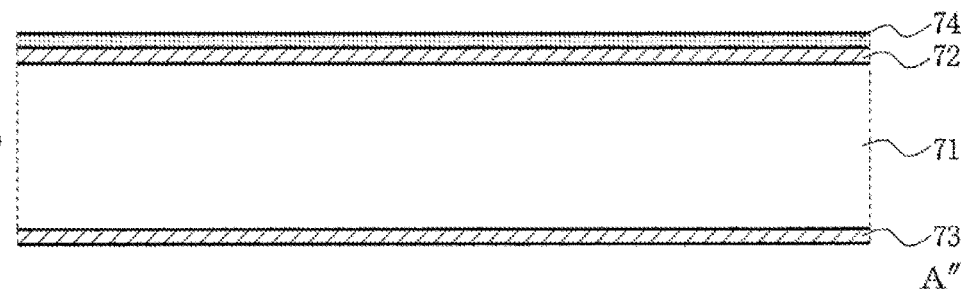

Next, as illustrated in FIG. 17B, an $Fe_{56}Pt_{44}$ thin film 74 having a thickness of 142 nm is deposited in accordance with an electron beam heating vapor deposition method. After that, the substrate is irradiated with infrared rays in a vacuum so as to be annealed, and thus, the $Fe_{56}Pt_{44}$ thin film 74 is converted to an alloy. Here, the temperature for heating is 650° C., and the time for heating is 15 minutes. Then, the $Fe_{56}Pt_{44}$ thin film 74 is magnetized by applying a magnetic field to the Si substrate 71 in the <011> direction. Here, the intensity of the magnetic field for magnetization is 5 tesla, and the time for magnetization is three minutes.

Figure 17C:
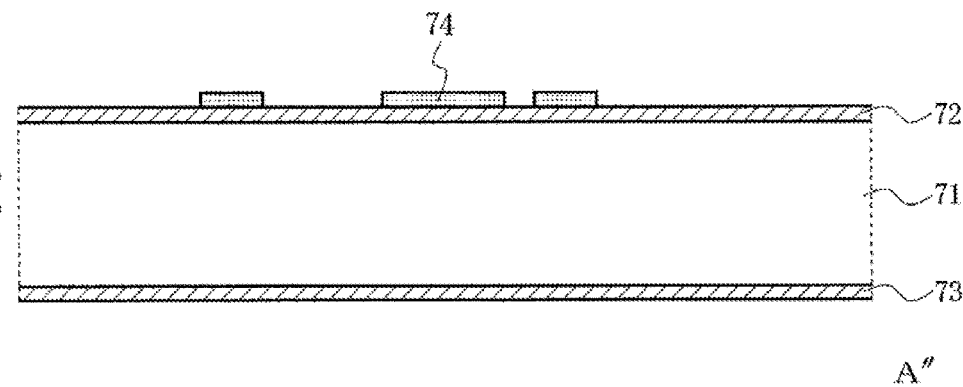
Figure 17D:
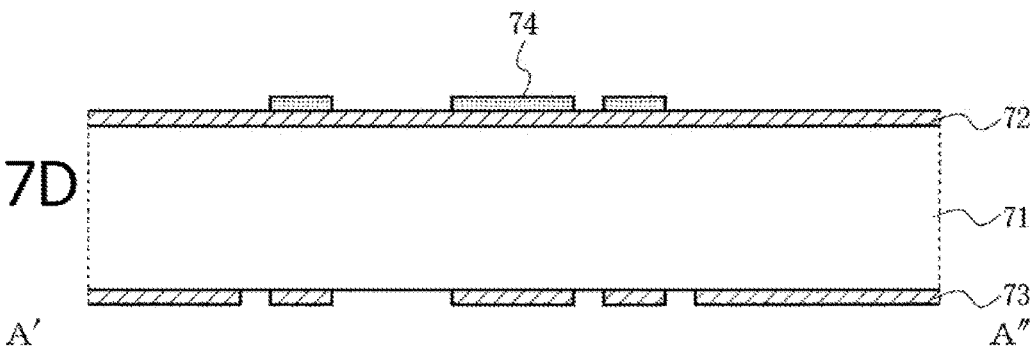
FIGS. 17D through 17F are diagrams illustrating the movable mirror portion of the two-dimensional optical scanning mirror device according to Example 7 of the present invention during the manufacturing process after the point in FIG. 17C and up to another point before completion.

Next, as illustrated in FIG. 17C, the $Fe_{56}Pt_{44}$ thin film 74 is processed in accordance with an ion milling method to shapes that correspond to the rotational outer frame 82 and the reflection portion 80 as illustrated in FIG. 8. At this time, the direction of the hinges 81 and 83, that is to say, the optical scanning rotation axis of the mirror portion, becomes the same as the <010> direction of the Si substrate 71, and thus, the magnetization direction is at 45° relative to the hinges 81 and 83. Then, as illustrated in FIG. 17D, a buffered HF solution is used to etch the $SiO_2$ film 73 to a pattern that corresponds to the patterned $Fe_{56}Pt_{44}$ thin film 74 and the outer peripheral portion of the Si substrate 71.

Figure 17E:
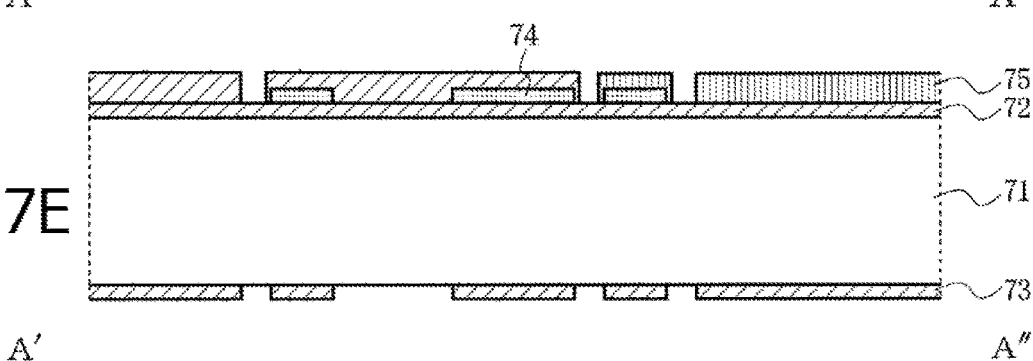

Next, as illustrated in FIG. 17E, a metal glass film 75 of which the pattern corresponds to the reflection portion 80, the hinge 81, the rotational outer frame 82, the hinge 83 and the non-rotational outer frame 84 is formed in accordance with a lift-off method. A film of $Zr_{75}Cu_{30}Al_{10}Ni_5$ having a thickness of 10 μm is formed as the metal glass film 75 in accordance with a sputtering method in an atmosphere of which the pressure has been reduced to 0.4 Pa.

Figure 17F:
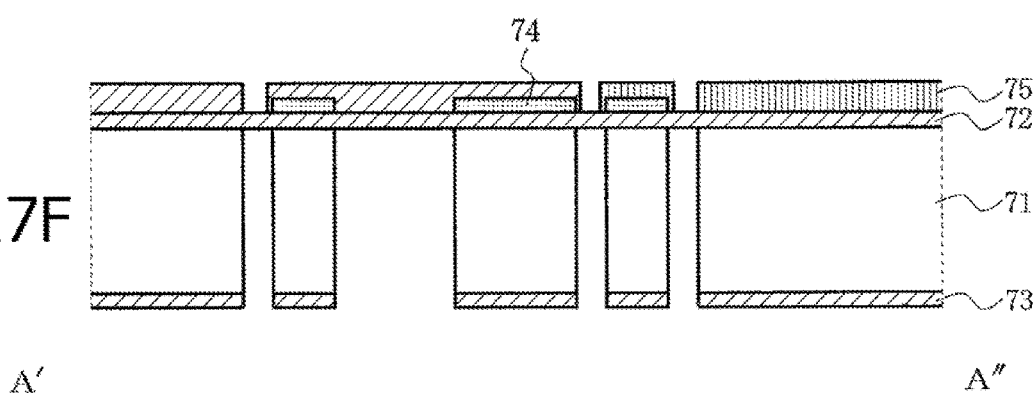
Figure 17G:
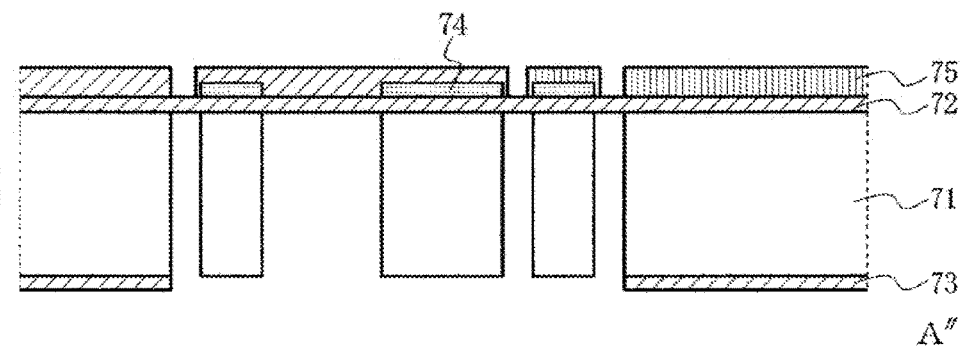
FIGS. 17G through 17I are diagrams illustrating the movable mirror portion of the two-dimensional optical scanning mirror device according to Example 7 of the present invention during the manufacturing process after the point in FIG. 17F.

Next, as illustrated in FIG. 17F, the Si substrate 71 is etched on the bottom side using the $SiO_2$ film 73 as a mask until the $SiO_2$ film 72 is partially exposed. Then, as illustrated in FIG. 17G, a buffered HF solution is used to remove the $SiO_2$ film 73 except the portion that is made to remain around the periphery.

Figure 17H:
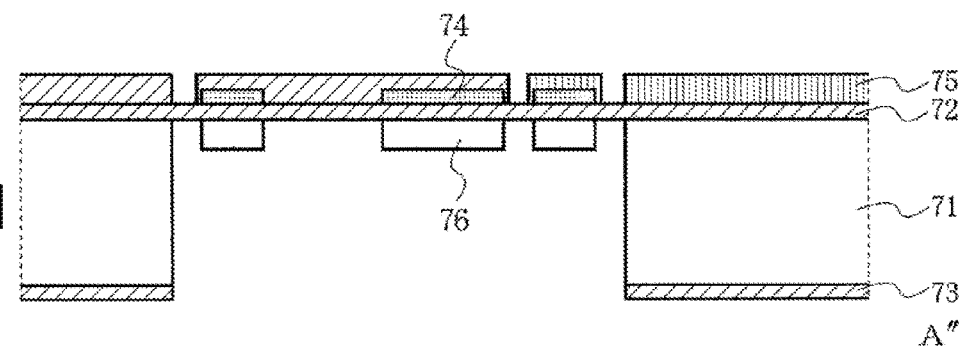
Figure 17I:
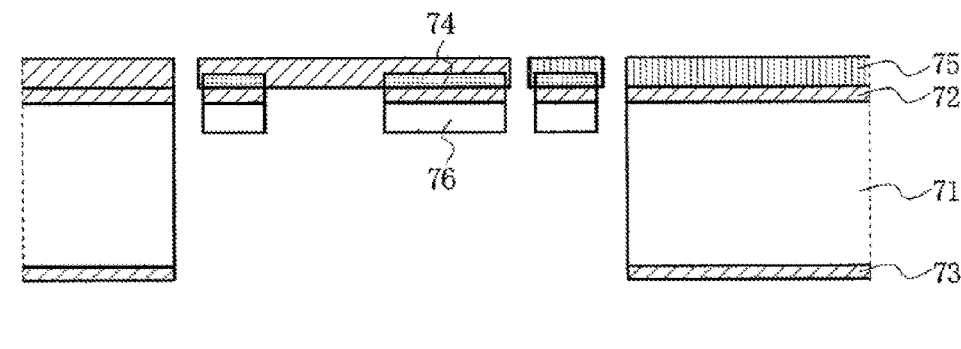

Next, as illustrated in FIG. 17H, the $SiO_2$ film 73 that remains around the periphery is used as a mask so as to etch the Si substrate 71 in such a manner that a Si layer having a thickness of 100 μm remains as a mirror base substrate 76. Then, as illustrated in FIG. 17I, a buffered HF solution is used to completely etch the exposed portion of the $SiO_2$ film 72 so that the hinges 81 and 83 consist of only the metal glass film 75. Then, the Si substrate 71 is diced to cut out a two-dimensional optical scanning mirror device, and thus, the basic structure of the movable mirror portion 70 of the two-dimensional scanning mirror device according to Example 7 of the present invention is complete.

Thought the manufacturing process is different, the final structure in Example 7 is the same as in Example 1, and therefore, the same characteristics as in Example 1 are gained.

Example 8

Figure 18A:
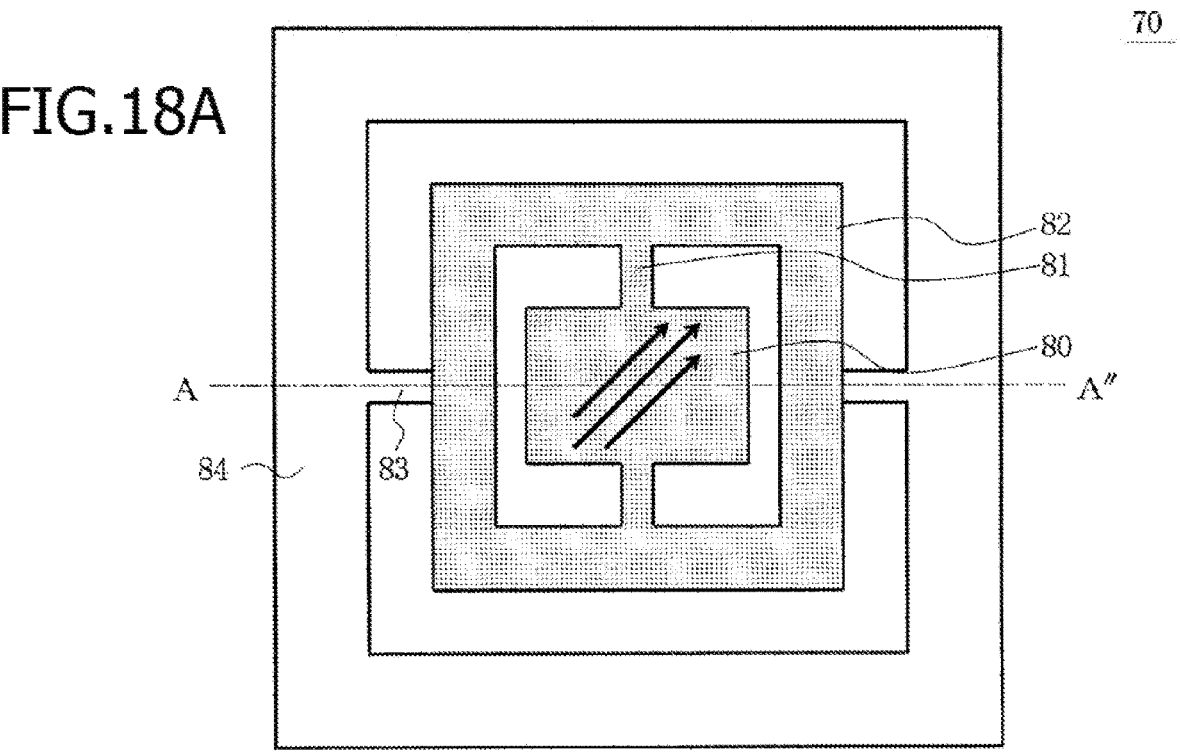
FIGS. 18A and 18B are schematic diagrams illustrating the movable mirror portion of the two-dimensional optical scanning mirror device according to Example 8 of the present invention.
Figure 18B:
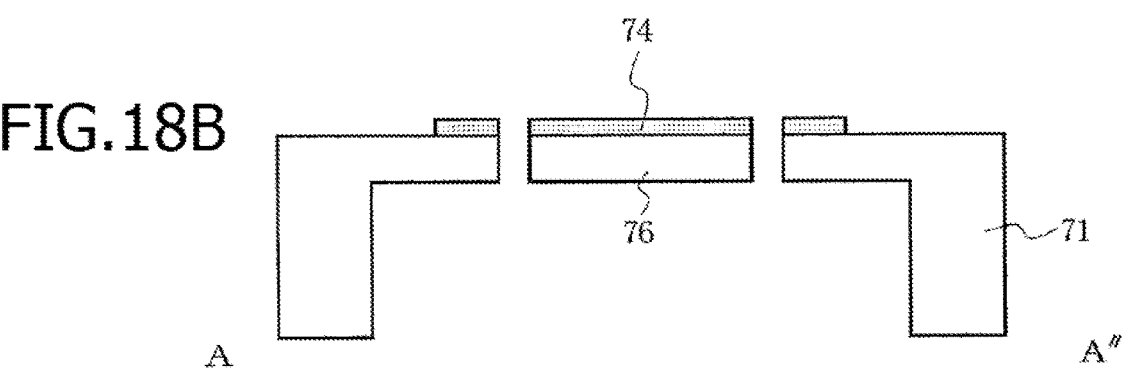

Next, the two-dimensional optical scanning mirror device according to Example 8 of the present invention is described in reference to FIGS. 18A and 18B and is the same as in Example 1 except that the $Fe_{56}Pt_{44}$ thin film 74 is used as a reflective film and does not form the $SiO_2$ film 72 having a thickness of approximately 100 nm that is formed in Example 1, and therefore, only the structure of the movable mirror portion is illustrated. FIGS. 18A and 18B are schematic diagrams illustrating the movable mirror portion of the two-dimensional optical scanning mirror device according to Example 8 of the present invention. FIG. 18A is an upper diagram, and FIG. 18B is a cross-sectional diagram along the single-dotted chain line connecting A and A" in FIG. 18A. Though the size of the reflection portion 80 and the entire size of the movable mirror portion 70 are arbitrary, here, the size of the reflection portion 80 is 500 μm×300 μm, and the size of the movable mirror portion 70 is 2.7 mm×2.5 mm.

As illustrated in FIGS. 18A and 18B, an $Fe_{56}Pt_{44}$ thin film 74 is provided on a Si substrate 71 with an extremely thin $SiO_2$ film (not shown) in-between, and the Si substrate 71 is etched on the bottom side in such a manner that the portion of a Si layer having a thickness of 100 µm that corresponds to the pattern of the $Fe_{56}Pt_{44}$ thin film 74 and the portions of the Si layer that correspond to the hinge 81, the rotational outer frame 82, the hinge 83 and the non-rotational outer frame 84 remain as the mirror base substrate 76. In this case as well, approximately the same characteristics as in Example 1 are gained.

Example 9

Figure 19A:
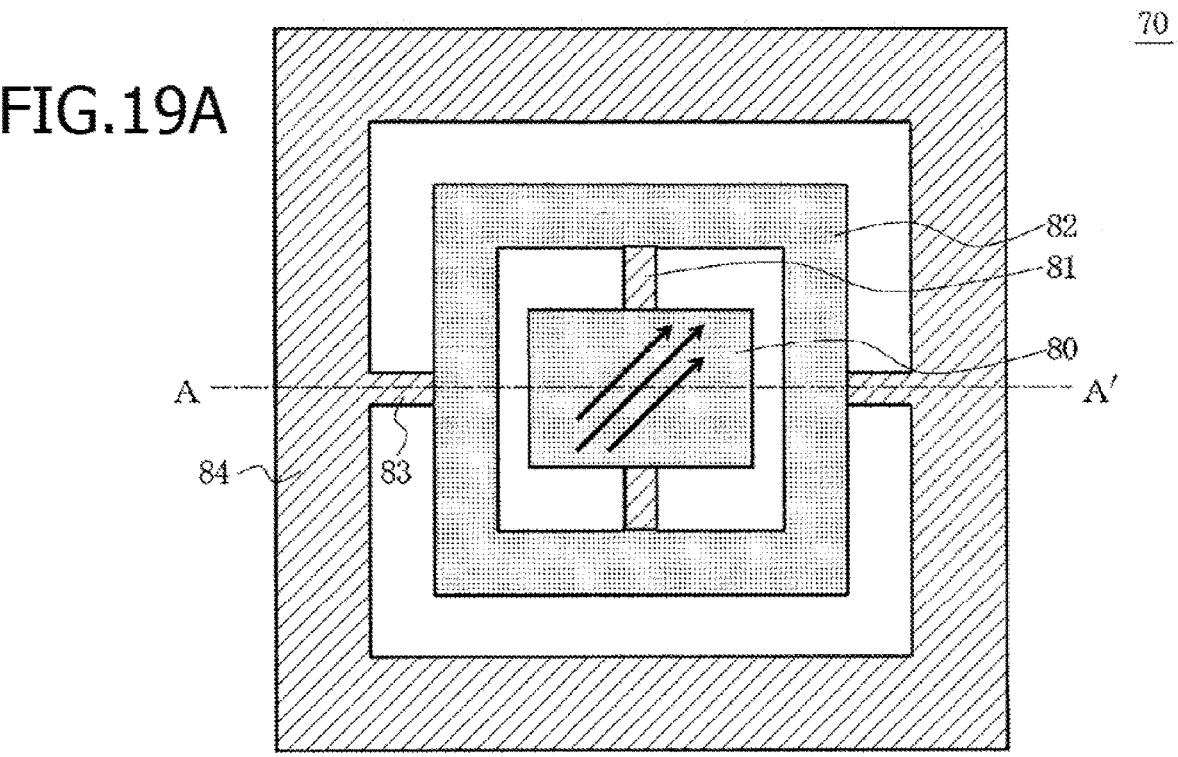
FIGS. 19A and 19B are schematic diagrams illustrating the movable mirror portion of the two-dimensional optical scanning mirror device according to Example 9 of the present invention.
Figure 19B:
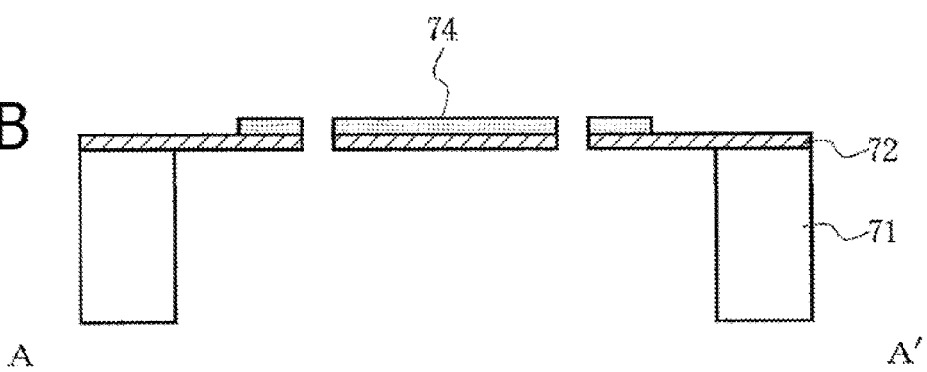

Next, the two-dimensional optical scanning mirror device according to Example 9 of the present invention is described in reference to FIGS. 19A and 19B as is basically the same as in Example 1 except that the $Fe_{56}Pt_{44}$ thin film 74 is used as a reflective film, and therefore, only the structure of the movable mirror portion is illustrated. FIGS. 19A and 19B are schematic diagrams illustrating the movable mirror portion of the two-dimensional optical scanning mirror device according to Example 9 of the present invention. FIG. 19A is an upper diagram, and FIG. 19B is a cross-sectional diagram along the single-dotted chain line connecting A and A" in FIG. 19A. Though the size of the reflection portion 80 and the entire size of the movable mirror portion 70 are arbitrary, here, the size of the reflection portion 80 is 500 µm×300 µm, and the size of the movable mirror portion 70 is 2.7 mm×2.5 mm.

As illustrated in FIGS. 19A and 19B, an $Fe_{56}Pt_{44}$ thin film 74 is provided on a Si substrate 71 with a $SiO_2$ film 72 in between, and the Si substrate 71 is etched on the bottom side in such a manner that the Si substrate 71 remains only around the periphery of the non-rotational outer frame 84. Then, the $SiO_2$ film 72 in the region between the reflection portion 80 and the rotational outer frame 82 is removed through etching, except the portions that correspond to the hinges 81. In this case as well, approximately the same characteristics as in Example 1 are gained.

Example 10

Figure 20:
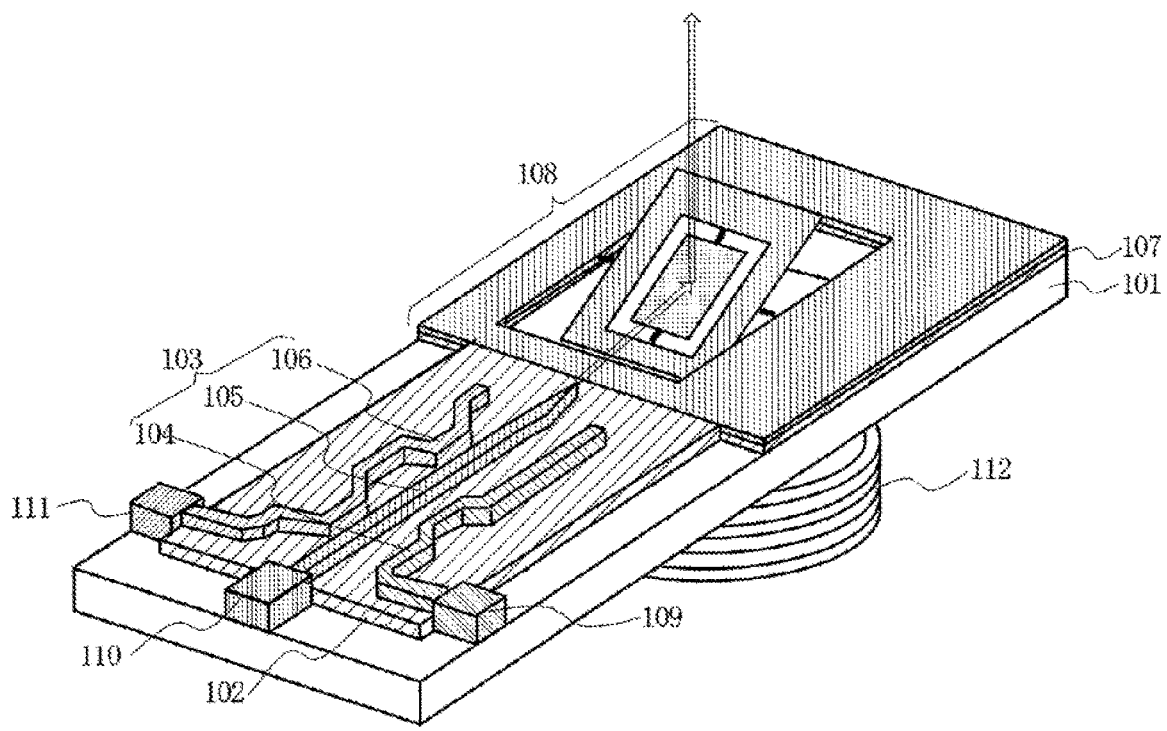
FIG. 20 is a schematic perspective diagram illustrating the two-dimensional optical scanning device according to Example 10 of the present invention.

Next, the two-dimensional optical scanning device according to Example 10 of the present invention is described in reference to FIG. 20. FIG. 20 is a schematic perspective diagram illustrating the two-dimensional optical scanning device according to Example 10 of the present invention. A two-dimensional optical scanning mirror device having the same structure as in Example 1 is used as a two-dimensional optical scanning mirror portion.

First, a $SiO_2$ film 102 having a thickness of 15 µm is formed on a Si substrate 101 having a thickness of 500 µm in accordance with a flame hydrolysis method. Then, a film of a $SiO_2$—$GeO_2$ layer having a thickness of 2 µm (refraction index difference Δn=0.5%, where Δn is defined as Δn=$(n_1-n_2)/n_1$, $n_1$ is the refraction index of the core, and $n_2$ is the refraction index of the clad) is formed on the $SiO_2$ film 102 in accordance with a flame hydrolysis method. On top of this, patterned optical waveguides 104 through 106 having a width of 2 µm are formed as an optical multiplexer 103 in accordance with a light exposure method using a contact mask.

Next, a $SiO_2$ film having a thickness of 20 µm (not shown) is formed in accordance with a flame hydrolysis method as an upper clad layer, which covers the entire pattern of the optical waveguides 104 through 106. Here, it is necessary to bend the light incident portion of the patterned optical waveguide 104 for red and the patterned optical waveguide 106 for blue at a right angle, and therefore, a deep trench having a depth of 30 µm is created in the portions to be bent through etching in accordance with a conversion ion beam method using Ga so that the guided light makes total reflection from the sidewalls of the trenches. Then, the $SiO_2$ film is completely removed through etching except for only in the optical multiplexer 103 region so as to leave the Si substrate 101 in an exposed state.

Next, concerning Example 1, a two-dimensional optical scanning mirror portion 108 is formed in the process illustrated in FIGS. 10A through 10I. Here, the entirety of this manufacturing process is basically carried out at a temperature of 200° C. or lower after magnetization so that the characteristics of the $Fe_{56}Pt_{44}$ thin film as a permanent magnet do not disappear. Here, 107 in the diagrams denotes a $SiO_2$ film.

Next, a red semiconductor laser chip 109, a green semiconductor laser chip 110 and a blue semiconductor laser chip 111 are bonded on the Si substrate 101 so that light can enter into the patterned optical waveguides 104 through 106. At this time, the Si substrate 101 is etched to a predetermined depth so that the laser emitting ends of the red semiconductor laser chip 109, the green semiconductor laser chip 110 and the blue semiconductor laser chip 111 match the positions of the patterned optical waveguides 104 through 106, respectively.

Next, a solenoid coil 112 for driving the reflection portion of the two-dimensional optical scanning mirror device 108 is arranged on the lower side of the Si substrate 101 so as to be fixed to the Si substrate 101 using an adhesive. At this time, the mirror surface of the reflection portion is inclined by 45° relative to the light beam that is approximately parallel to the main surface of the substrate 101 in a state where an optical scanning signal is not applied to the solenoid coil 112. That is to say, the reflection portion is placed so as to be inclined by 45° relative to the light beam by means of a mechanical external force, and the hinges made of metal glass are irradiated with a focused laser beam (beam diameter: 70 µm, output: 10 mW) so as to locally heat the hinges, and thus, the reflection portion is fixed in an inclined state of 45°. As a result, the stress caused on the hinges can be mitigated, and thus, the reflection portion stays inclined by 45° even when the external force is removed. At this time, the mechanical external force is applied by using a probe (cantilever). As for the size of this two-dimensional optical scanning device, the length is 6 mm, the width is 3 mm and the height is 3 mm, and thus, ultra-miniaturization can be achieved.

In order to make the mirror surface incline by 45° relative to the light beam from the beginning in a state where an optical scanning signal is not applied to the solenoid coil 112, a constant direct current may be made to flow through the solenoid coil 112. When an alternating signal is made to flow in addition to this direct current, the scanning mirror can be rotated with the position that is inclined by 45° being the center.

Alternatively, a permanent magnet can be arranged in the vicinity of the solenoid coil 112 so that the mirror surface inclines by 45° relative to the light beam. In this case, the scanning mirror can be rotated with the position that is inclined by 45° being the center by simply allowing an alternating signal to flow through the solenoid coil 112.

In Example 10, an optical multiplexer and a movable mirror portion are integrated on a Si substrate, and therefore, the total size of the two-dimensional optical scanning device can be made compact, which is preferable as the two-dimensional optical scanning device for a spectacle-type retina scanning display.

Example 11

Figure 21:
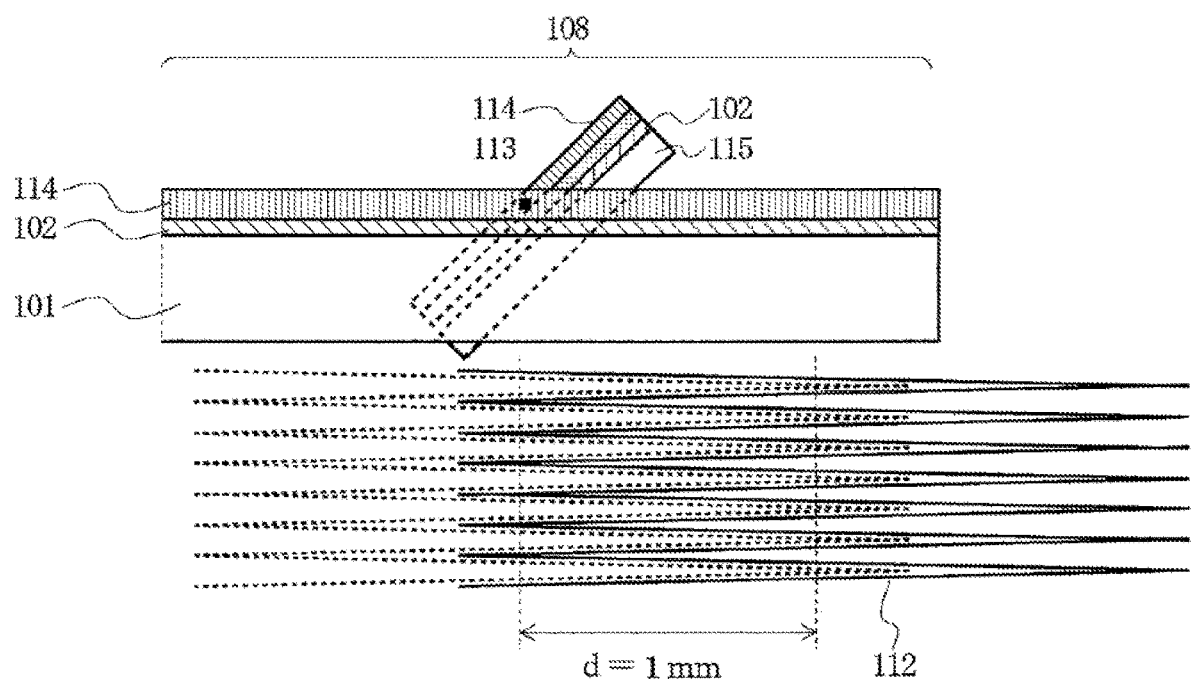
FIG. 21 is a schematic perspective diagram illustrating the two-dimensional optical scanning device according to Example 11 of the present invention.

Next, the two-dimensional optical scanning device according to Example 11 of the present invention is described in reference to FIG. 21 and is the same as in Example 10 except for the position of the solenoid coil, and therefore, only the portion in the vicinity of the solenoid coil is illustrated. FIG. 21 is a side diagram illustrating the portion in the vicinity of the solenoid coil of the two-dimensional optical scanning device according to Example 11 of the present invention. The center axis of the solenoid coil 112 having an outer diameter of 5 mm and a height of 3 mm and of which the number of turns of the wire is 800 is arranged in a place that is shifted by 1 mm from the center portion of the two-dimensional scanning mirror portion 108 in the direction of the laser beam.

When the center axis of the solenoid coil 112 is shifted by 1 mm from the center portion of the two-dimensional scanning mirror portion 108 in the direction of the laser beam as described above, the end portion of the magnetized two-dimensional scanning mirror portion 108 and the solenoid coil 112 are made to be in proximity to each other, and thus, the interaction becomes greater. Therefore, the intensity of the direct current can be reduced by 50% as compared to the case where the center axis of the solenoid coil 112 matches the center portion of the two-dimensional scanning mirror portion 108. In this case as well, an alternating signal can be made to flow in addition to the direct current so that the scanning mirror can be rotated with the position that is inclined by 45° being the center. Here, 113, 114 and 115 in FIG. 21 denote an $Fe_{56}Pt_{44}$ thin film, a metal glass film and a mirror base substrate, respectively.

Example 12

Figure 22:
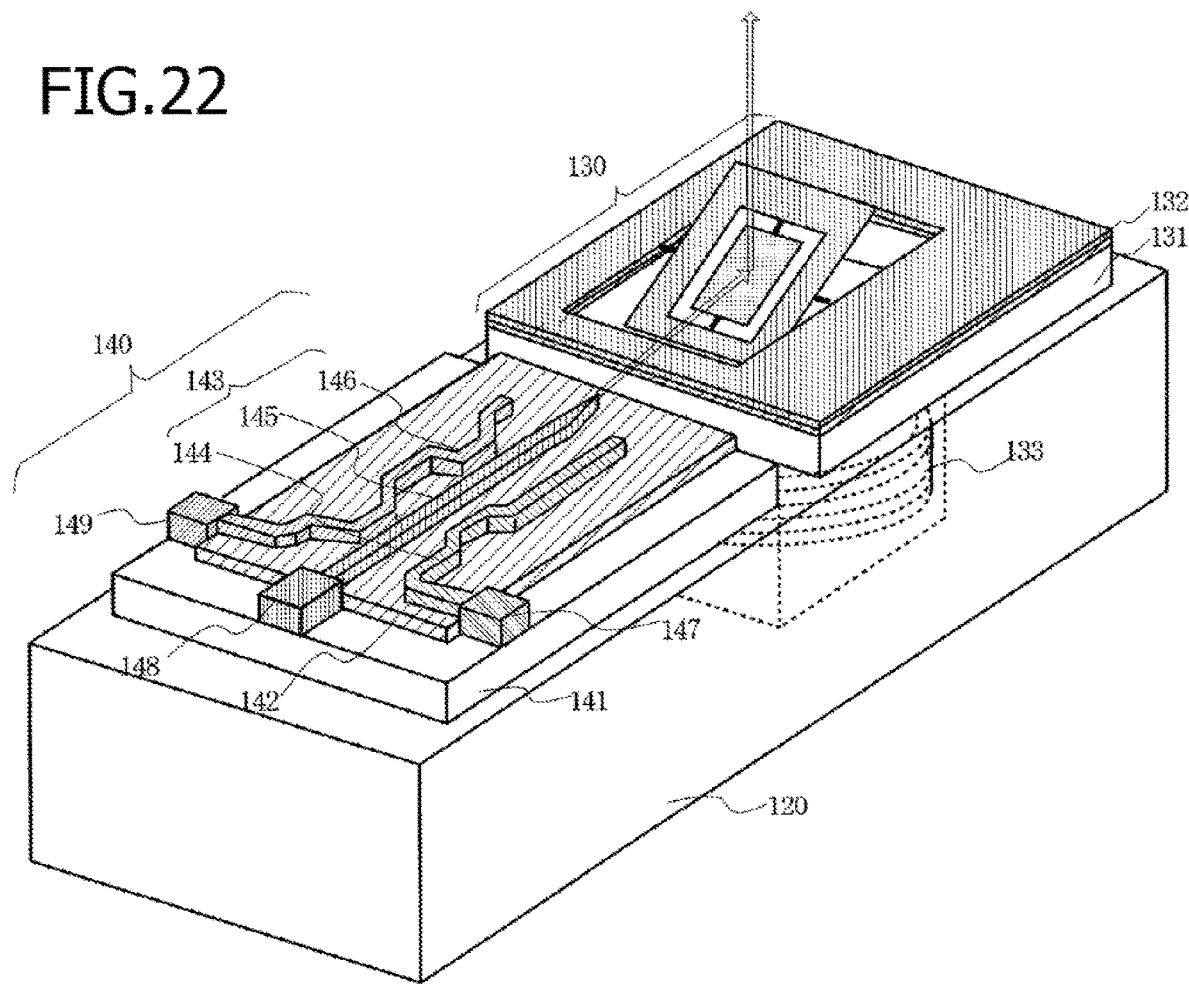
FIG. 22 is a schematic perspective diagram illustrating the two-dimensional optical scanning device according to Example 12 of the present invention.

Next, the two-dimensional optical scanning device according to Example 12 of the present invention is described in reference to FIG. 22. FIG. 22 is a schematic perspective diagram illustrating the two-dimensional optical scanning device according to Example 12 of the present invention. A two-dimensional optical scanning mirror device having the same structure as in Example 1 is used as the two-dimensional optical scanning mirror portion.

A two-dimensional optical scanning mirror device 130 having a solenoid coil 133 is mounted on a mounting substrate 120, and at the same time, a light source device 140 is mounted in such a location that the two-dimensional optical scanning mirror device 130 is irradiated with a laser beam. This light source device has the same structure as the light source unit in the two-dimensional optical scanning device in Example 10. That is to say, patterned optical waveguides 144 through 146 are provided on a Si substrate 141 with a $SiO_2$ film 142 in between, and a $SiO_2$ film (not shown) that becomes an upper clad layer is provided on top of that so as to form an optical multiplexer 143. Then, the $SiO_2$ film 142 in the region other than the region where the optical multiplexer 143 has been formed is removed so as to expose the Si substrate 141. Here, 131 and 132 in FIG. 22 denote a Si substrate and a $SiO_2$ film, respectively.

Next, a red semiconductor laser chip 147, a green semiconductor laser chip 148 and a blue semiconductor laser chip 149 are bonded on the Si substrate 141 so that light can enter into the patterned optical waveguides 144 through 146. At this time, the Si substrate 141 is etched to a predetermined depth so that the laser emitting ends of the red semiconductor laser chip 147, the green semiconductor laser chip 148 and the blue semiconductor laser chip 149 match the positions of the patterned optical waveguides 144 through 146, respectively.

In Example 12 of the present invention, the two-dimensional optical scanning mirror device 130 and the light source device 140 are formed on different substrates, and therefore, the respective manufacturing processes have fewer limitations in terms of the temperature for heat treatment or the etching conditions. Here, the mounting substrate may be an insulating substrate such as a sapphire substrate, a metal substrate or a printed circuit board, taking the electrical connections to the two-dimensional optical scanning mirror device 130 and the light source device 140 into consideration.

Here, the following supplementary notes are added concerning the embodiments of the present invention including Examples 1 through 12.

(1) A two-dimensional optical scanning mirror device, comprising: a substrate; a movable mirror portion supported on the substrate in such a manner that two-dimension optical scanning is possible; a hard magnetic thin film provided in the movable mirror portion; and a magnetic field generator that includes at least an alternating magnetic field generator for driving the movable mirror portion, wherein the hard magnetic thin film has a magnetization direction in a direction of a film plane, and the ratio of the magnetic field generated by the magnetic field generator relative to the coercive force of the hard magnetic thin film is 0.2 or lower.

(2) The two-dimensional optical scanning mirror device according to (1), wherein the hard magnetic thin film becomes a reflecting mirror.

(3) The two-dimensional optical scanning mirror device according to (1), further comprising a reflective film that becomes a reflecting mirror at least on a surface of the hard magnetic thin film.

(4) The two-dimensional optical scanning mirror device according to any of (1) through (3), wherein the movable mirror portion comprises: a reflection portion; a rotational outer frame for supporting the reflection portion with a pair of first hinges; and a non-rotational outer frame for supporting the rotational outer frame with a pair of second hinges provided in the direction that is orthogonal to the first hinges.

(5) The two-dimensional optical scanning mirror device according to (4), wherein the rotational outer frame and the non-rotational outer frame are formed of metal glass that also functions as a reflecting mirror.

(6) The two-dimensional optical scanning mirror device according to (4), wherein the rotational outer frame and the non-rotational outer frame are formed of a non-magnetic dielectric film and the hard magnetic thin film is provided on the reflection portion and the rotational outer frame.

(7) The two-dimensional optical scanning mirror device according to any of (1) through (6), wherein the coercive force of the hard magnetic thin film is 100 kA/m or greater.

(8) The two-dimensional optical scanning mirror device according to any of (1) through (7), wherein the hard magnetic thin film is made of a magnetic material of which the main components are Fe and Pt, a magnetic material of which the main components are Co and Pt, or a magnetic material of which the main components are Fe and Pd.

(9) The two-dimensional optical scanning mirror device according to any of (1) through (8), wherein the magnetization direction of the hard magnetic thin film is at an angle within a range of 45°+/−30° relative to the optical scanning rotation axis of the movable mirror portion.

(10) The two-dimensional optical scanning mirror device according to any of (1) through (9), wherein the reflective surface of the movable mirror portion inclines by an angle within a range of 45°+/−30° relative to the main surface of the substrate in a state where an optical scanning signal is not applied to the alternating magnetic field generator.
(11) The two-dimensional optical scanning mirror device according to any of (1) through (9), wherein the substrate is a single crystal Si substrate.
(12) A manufacturing method for a two-dimensional optical scanning mirror device, comprising: forming a hard magnetic thin film on a substrate; magnetizing the hard magnetic thin film; and forming a movable mirror portion by processing the magnetized hard magnetic thin film.
(13) The manufacturing method for a two-dimensional optical scanning mirror device according to (12), further comprising annealing the hard magnetic thin film before the step of magnetizing the hard magnetic thin film.
(14) A two-dimensional optical scanning device, comprising: the two-dimensional optical scanning mirror device according to any of (1) through (13); and a light source formed on the substrate.
(15) A two-dimensional optical scanning device, comprising: the two-dimensional optical scanning mirror device according to any of (1) through (13); a mounting substrate on which the two-dimensional optical scanning mirror device is mounted; and a light source that is mounted in such a location that the two-dimensional optical scanning mirror device on the mounting substrate is irradiated with a laser beam.
(16) The two-dimensional optical scanning device according to (14) or (15), wherein the light source comprises a red laser, a green laser, a blue laser and an optical multiplexer for multiplexing the light outputted from the red laser, the green laser and the blue laser.
(17) An image projector, comprising: the two-dimensional optical scanning device according to any of (14) through (16); a two-dimensional optical scanning controller for two-dimensionally scanning the emission light emitted from the light source by applying a two-dimensional optical scanning signal to the alternating magnetic field generator; and an image formation unit for projecting the scanned emission light onto a projection surface.

REFERENCE SIGNS LIST 10 movable mirror unit
11 first hinge
12 rotational outer frame
13 second hinge
14 non-rotational outer frame
20 reflection portion
21 substrate
22 hard magnetic thin film
23 reflective film
30 magnetic field generator
31 alternating magnetic field generator
32 permanent magnet
41 optical multiplexer
42 red laser
43 green laser
44 blue laser
50 control unit
51 controller
52 operating unit
53 external I/F
54 R laser driver
55 G laser driver
56 B laser driver
57 two-dimensional scanning driver
58 concave reflecting mirror
59 pupil
60 retina
70 movable mirror portion
71 Si substrate
72, 73 $SiO_2$ film
74, $74_1$, $74_2$, $74_3$, $74_4$, $74_5$ $Fe_{56}Pt_{44}$ thin film
75 metal glass film
76 mirror base substrate
77 $Co_{80}Pt_{20}$ thin film
78 $Co_{80}Pd_{20}$ thin film
79, $79_1$, $79_2$ $SiO_2$ film
80 reflection portion
81, 83 hinge
82 rotational outer frame
84 non-rotational outer frame
90 solenoid coil
101 Si substrate
102 $SiO_2$ film
103 optical multiplexer
104-106 patterned optical waveguide
107 $SiO_2$ film
108 two-dimensional optical scanning mirror portion
109 red semiconductor laser chip
110 green semiconductor laser chip
111 blue semiconductor laser chip
112 solenoid coil
113 $Fe_{56}Pt_{44}$ thin film
114 metal glass film
115 mirror base substrate
120 mounting substrate
130 two-dimensional optical scanning mirror device
131 Si substrate
132 $SiO_2$ film
133 solenoid coil
140 light source device
141 Si substrate
142 $SiO_2$ substrate
143 optical multiplexer
144-146 patterned optical waveguide
147 red semiconductor laser chip
148 green semiconductor laser chip
149 blue semiconductor laser chip

The invention claimed is:
1. A two-dimensional optical scanning mirror device, comprising:
a substrate;
a movable mirror portion supported on the substrate in such a manner that two-dimension optical scanning is possible;
a hard magnetic thin film provided in the movable mirror portion; and
a magnetic field generator that includes at least an alternating magnetic field generator for driving the movable mirror portion, wherein
the hard magnetic thin film has a magnetization direction in a direction of a film plane, and
the ratio of the magnetic field generated by the magnetic field generator relative to the coercive force of the hard magnetic thin film is 0.2 or lower, and the coercive force of the hard magnetic thin film is 100 kA/m or greater.

2. The two-dimensional optical scanning mirror device according to claim 1, wherein the hard magnetic thin film becomes a reflecting mirror.

3. The two-dimensional optical scanning mirror device according to claim 1, further comprising a reflective film that becomes a reflecting mirror at least on a surface of the hard magnetic thin film.

4. The two-dimensional optical scanning mirror device according to claim 1, wherein the magnetization direction of the hard magnetic thin film is at an angle within a range of 45°+/−30° relative to the optical scanning rotation axis of the movable mirror portion.

5. The two-dimensional optical scanning mirror device according to claim 1, wherein the reflective surface of the movable mirror portion inclines by an angle within a range of 45°+/−30° relative to a main surface of the substrate in a state where an optical scanning signal is not applied to the alternating magnetic field generator.

6. A two-dimensional optical scanning device, comprising:
   the two-dimensional optical scanning mirror device according to claim 1; and
   a light source formed on the substrate.

7. A two-dimensional optical scanning device, comprising:
   the two-dimensional optical scanning mirror device according to claim 1;
   a mounting substrate on which the two-dimensional optical scanning mirror device is mounted; and
   a light source that is mounted in such a location that the two-dimensional optical scanning mirror device on the mounting substrate is irradiated with a laser beam.

8. An image projector, comprising:
   the two-dimensional optical scanning device according to claim 6;
   a two-dimensional optical scanning controller for two-dimensionally scanning the emission light emitted from the light source by applying a two-dimensional optical scanning signal to the alternating magnetic field generator; and
   an image formation unit for projecting the scanned emission light onto a projection surface.

9. An image projector, comprising:
   the two-dimensional optical scanning device according to claim 7;
   a two-dimensional optical scanning controller for two-dimensionally scanning the emission light emitted from the light source by applying a two-dimensional optical scanning signal to the alternating magnetic field generator; and
   an image formation unit for projecting the scanned emission light onto a projection surface.

* * * * *

UNITED STATES PATENT AND TRADEMARK OFFICE
CERTIFICATE OF CORRECTION

| | | |
|---|---|---|
| PATENT NO. | : 11,067,792 B2 | Page 1 of 1 |
| APPLICATION NO. | : 16/193084 | |
| DATED | : July 20, 2021 | |
| INVENTOR(S) | : Toshio Katsuyama et al. | |

It is certified that error appears in the above-identified patent and that said Letters Patent is hereby corrected as shown below:

On the Title Page

Page 2 Item (56), Column 2:
Change:
EU application No. 20215978.6 (12 pages)
To be:
EP application No. 20215978.6 (12 pages)

Signed and Sealed this
Seventeenth Day of May, 2022

Katherine Kelly Vidal
*Director of the United States Patent and Trademark Office*